(12) United States Patent
Gauthier et al.

(10) Patent No.: US 6,502,234 B1
(45) Date of Patent: Dec. 31, 2002

(54) COMPONENT BASED WIZARD FOR CREATING WIZARDS

(75) Inventors: Charles Salo Gauthier, Stewartville, MN (US); Kevin Glen Minard, Parker, CO (US); Jay Daniel Toogood, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/231,122

(22) Filed: Jan. 15, 1999

(51) Int. Cl.[7] .................................................. G06F 9/44
(52) U.S. Cl. ...................... 717/107; 717/101; 717/106; 717/108; 717/109; 717/115; 717/116
(58) Field of Search ................................ 717/101, 106, 717/108, 115, 116, 109, 107; 345/336, 418, 470

(56) References Cited

U.S. PATENT DOCUMENTS

| | | | | |
|---|---|---|---|---|
| 5,859,637 A | * | 1/1999 | Tidwell, II .................. | 345/366 |
| 6,053,951 A | * | 4/2000 | McDonald et al. ......... | 717/109 |
| 6,233,726 B1 | * | 5/2001 | Bowman et al. ............ | 707/102 |
| 6,263,492 B1 | * | 7/2001 | Fraley et al. ............... | 717/107 |

OTHER PUBLICATIONS

Tidwell et al., "TaskGuides: instant wizards on the Wed", ACM, pp. 263–272, Oct. 1997.*

Priestley, "A wizard for wizards: decision support for the new or despairing user", ACM, pp. 98–102, Sep. 1998.*

Batory et al., "Design wizards and visual programming environments for generators", IEEE, pp. 255–267, Jun. 1998.*

Hogue, "The wizard of UI–the technical writer and user interface reviews", IEEE, pp. 405–412, Oct. 1997.*

* cited by examiner

*Primary Examiner*—Gregory Morse
*Assistant Examiner*—Ted T. Vo
(74) *Attorney, Agent, or Firm*—S. Jared Pitts; Keith L. Jenkins

(57) ABSTRACT

The preferred embodiment of the present invention an object oriented wizard creation mechanism provides an environment and set of facilities for creating and modifying wizards. The preferred embodiment wizard creation mechanism provides a WizardWizard mechanism for creating the skeleton of new wizard, a WizardDesigner mechanism for specializing and WizardMetaDataManager mechanism for persisting and retrieving created wizards. The WizardWizard guides the developer through a predetermined series of steps that are required to define a the basic components of a new wizard. The WizardDesigner takes these basic components and guides the developer through a specialization process that further customizes and defines the new wizard. In the preferred embodiment, the WizardWizard and the WizardDesigner create and specialize the target wizard from a component based Wizard framework. The use of the component based Wizard framework with the WizardWizard and WizardDesigner provide a customizable and extensible wizard creation solution to that has utmost functionality and flexibility to the users and developers.

54 Claims, 28 Drawing Sheets

Wizard State Specialization

*Wizard Designer State Object Specialization*

For Subwizard: SUBWIZARD B

For State: State B

New State Attributes(s):

| NAME | Attribute1 |
|------|------------|
| TYPE | Long |
| REQ? | Yes |
| DESC. | |

ADD

CURRENT ATTRIBUTES

| NAME | TYPE | DESCRIPTION | REQUIRED? |
|------|------|-------------|-----------|
| | | | |
| | | | |
| | | | |

REMOVE

Back | Next | Finish | Cancel | Help

COMPONENT BASED WIZARD FOR CREATING WIZARDS

RELATED APPLICATIONS

This application is related to the following U.S. patent applications: "A Component Based Designer for Modifying and Specializing Wizards", Ser. No. 09/231,121, filed on Jan. 15, 1999.

BACKGROUND OF THE INVENTION

1. Technical Field

The present invention relates in general to the computer programming. More specifically, the present invention relates to the field of object oriented methods for creating and modifying software applications.

2. Background Art

The development of the EDVAC computer system of 1948 is often cited as the beginning of the computer era. Since that time computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks are capable of performing jobs that no single computer could perform and they allow low cost personal computer systems to connect to larger systems to perform tasks that such low cost systems could not perform alone. In order for computer systems to cooperate in a network to perform some complex job, software must be developed which efficiently delegates parts of the chore or tasks to different computers in the network. One of the recent advances in the field of software development has been the emergence of object oriented programming technology.

The goal of using object-oriented programming is to create small, reusable sections of program code known as objects that can be quickly and easily combined and re-used to create new programs. This is similar to the idea of using the same set of building blocks again and again to create many different structures. The modular and reusable aspects of objects typically speeds development of new programs, thereby reducing the costs associated with the development cycle. In addition, by creating and re-using a group of well-tested objects, a more stable, uniform, and consistent approach to developing new computer programs can be achieved.

Although object-oriented programming offers significant improvements over other programming types, program development still requires significant amounts of time and effort, especially if no preexisting objects are available as a starting point. Consequently, one approach has been to provide a program developer with a set of predefined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

While object-oriented programming and the use of frameworks has greatly simplified the task of creating useful and efficient computer programs, some difficulties remain. For example, there are many times when a user needs to perform repetitive set of tasks need in a certain sequence to arrive at a desired outcome. Wizards are software utilities used by applications to help users perform a particular task. Wizards help users perform complex tasks by guiding the user in a step by step fashion. For example, wizards have been added to software applications to help users configure peripherals such as modems and printers. Such a wizard guides the user through each step, such as selecting installation options, selecting ports, installing necessary software driver, creating necessary links to other applications, and setting any other necessary parameters.

Typically, the wizard attempts to guide the user as much as possible. For example, instead of forcing the user to type in a cryptic and hard to remember parameter, the wizard provides a list of potentially acceptable parameters. As another example, the wizard may only provide as options those parameters that do not conflict with other applications and/or devices. In such a way, the wizard guides the user through the otherwise difficult process.

Wizards thus provide an improved user interface that allows users with less technical sophistication to efficiently configure and use their computer. Unfortunately, the widespread adoption of wizards in software applications has been limited by the time and difficulty involved in creating them. While a number of different application programming interfaces (APIs) are available for creating wizards, the content and capabilities of these interfaces are limited. In particular, wizard developers are still required to understand the specifics of these APIs in order to implement wizards. Thus, while these software development products assist in the creation of wizards, they still require extensive and detailed knowledge to use. Additionally, they typically require an extensive amount of custom coding for each wizard. This makes it difficult for even professional programers to add wizard functionality to their applications, and makes it almost impossible for less technically sophisticated end users to add or modify existing wizards on their own.

Thus, what is needed is an improved mechanism and method for facilitating the creation and customization of wizards in a wide variety of programming environments.

DISCLOSURE OF THE INVENTION

According to the present invention, an component based wizard creation mechanism provides an environment and set of facilities for creating and modifying wizards. The preferred embodiment wizard creation mechanism provides a WizardWizard mechanism for creating the skeleton of new wizard, a WizardDesigner mechanism for specializing and WizardMetaDataManager mechanism for persisting and retrieving created wizards. The WizardWizard guides the developer through a predetermined series of steps that are required to define a the basic components of a new wizard. The WizardDesigner takes these basic components and guides the developer through a specialization process that further customizes and defines the new wizard. In the preferred embodiment, the WizardWizard and the WizardDesigner create and specialize the target wizard from a component based Wizard framework. The use of the component based Wizard framework with the WizardWizard and WizardDesigner provide a customizable and extensible wizard creation solution to that has utmost functionality and flexibility to the users and developers.

The foregoing and other features and advantages of the present invention will be apparent from the following more particular description of the preferred embodiment of the invention, as illustrated in the accompanying drawings.

BRIEF DESCRIPTION OF THE DRAWINGS

FIGS. 17–27 are block diagrams illustrating exemplary WizardDesigner user interface panels in accordance with the preferred embodiment.

BEST MODE FOR CARRYING OUT THE INVENTION

Figure 1:
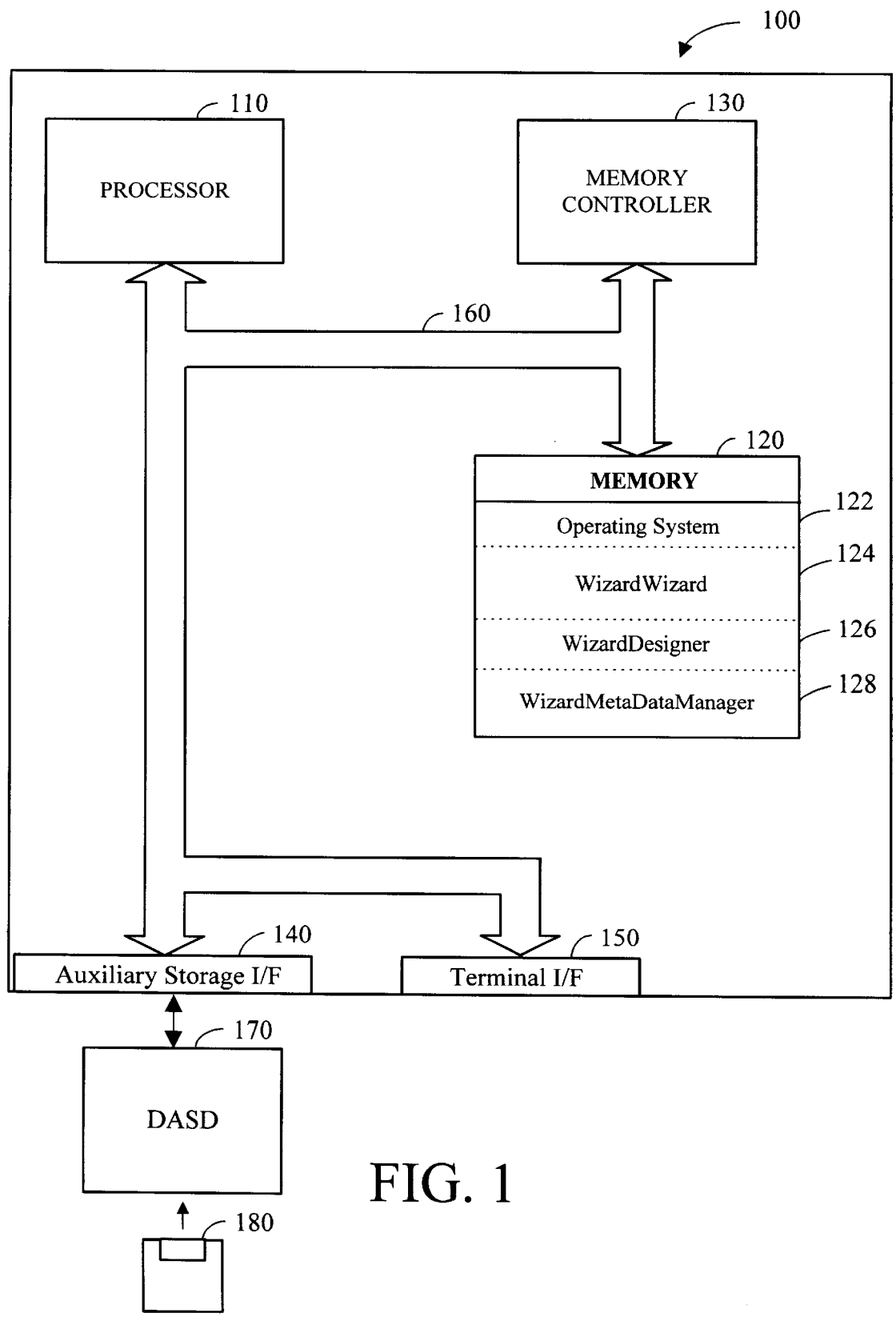
FIG. 1 is a schematic view of a computer system in accordance with a preferred embodiment of the present invention.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

1. OVERVIEW

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and Java are all examples of languages that support object-oriented programming to one degree or another.

Object-oriented Frameworks

There has been an evolution of terms and phrases which have particular meaning to those skilled in the art of object-oriented design. However, the reader should note that one of loosest definitions in the art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe a mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

While in general terms an object-oriented framework mechanism can be properly characterized as an object-oriented solution, there is nevertheless a fundamental difference between a framework mechanism and a basic object-oriented solution. The difference is that framework mechanisms are designed in a way that permits and promotes customization and extension of certain aspects of the solution. In other words, a framework mechanisms amount to more than just a solution to the problem. The mechanisms provide a living solution that can be customized and extended to address individualized requirements that change over time. Of course, the customization/extension quality of framework mechanisms is extremely valuable to framework consumers because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

2. DETAILED DESCRIPTION

Referring now to FIG. 1, a computer system 100 in accordance with a preferred embodiment of the present invention is a standard IBM compatible 32-bit computer system, although other hardware platforms such as PowerPC based systems can be used. Those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes object-oriented computer programs within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, a WizardWizard 124, a WizardDesigner 126 and a WizardMetaDataManager 128. It should be understood that for purposes of this application, in memory 120 is used in its broadest sense, and can include Dynamic Random Access Memory (DRAM), Static RAM (SRAM), flash memory, cache memory, etc. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

The operating system 122 provides the basic functionality that controls the computer system 100. Operating system 122 can comprise any suitable operating system, such as IBM's AS/400, OS/2, Microsoft's Windows, Java and the various flavors of UNIX.

In accordance with the preferred embodiment of the present invention, WizardWizard 124 provides an environment and set of facilities that assists users in the creation of new target wizards. In this application, the term "target wizard(s)" is meant to refer to wizard(s) that are created using the preferred embodiment. WizardWizard 124 guides users through the process of creating the core elements of a target wizard. These core elements include the basic "objects" that make up the target wizard. This set of objects that make up the basic elements of a target wizard will be referred to as a "target wizard skeleton".

In accordance with the preferred embodiment of the present invention, WizardDesigner 126 provides an environment and set of facilities that assists users in the creation and modification of target wizards. In particular, WizardDesigner 126 guides users through the process of specializing a target wizard skeleton to perform in a particular manner. WizardDesigner 126 can also be used to modify and/or further specialize a previously created target wizard.

In accordance with the preferred embodiment of the present invention, WizardMetaDataManager 128 provides the ability to persist meta data for created target wizards, and the ability to retrieve target wizard meta data for further modification and specialization when desired.

Figure 2:
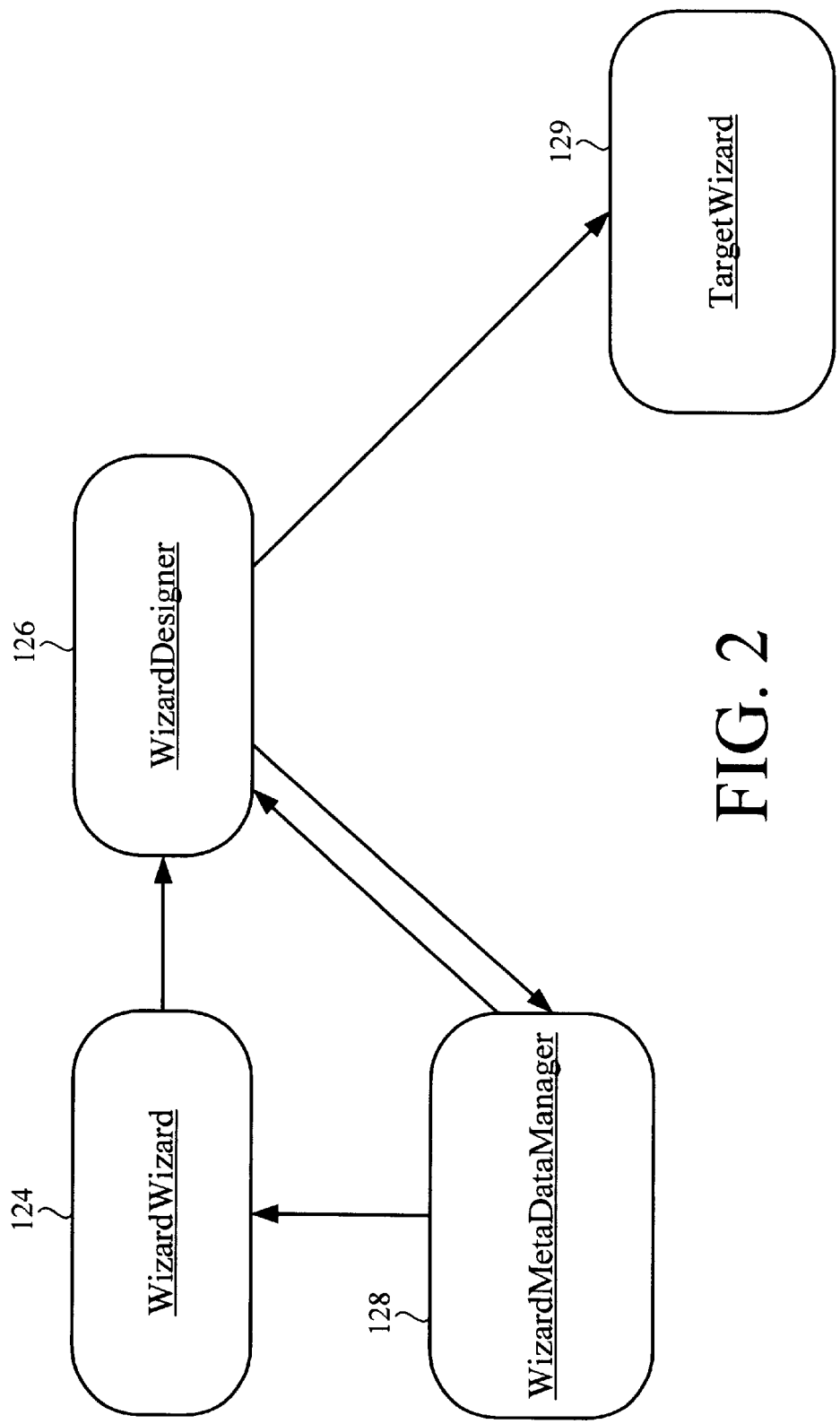
FIG. 2 is a functional block diagram illustrating a WizardWizard mechanism, a WizardDesigner mechanism, a WizardMetaDataManager mechanism, and a Target Wizard in accordance with the preferred embodiment.

Referring now to FIG. 2, the key software elements of the preferred embodiment are illustrated schematically to better show their operation and interactions. In particular, WizardWizard 124, WizardDesigner 126 and WizardMetaDataManager 128 are provided to create, specialize and persistent wizards, such as target wizard 129. Again, In this application, the term "target wizard" is used to refer to the wizard being created or modified by the elements of the preferred embodiment. In typical usage, WizardWizard 124 is used to create a target wizard skeleton. As discussed above, this target wizard skeleton includes the basic objects used to provide the target wizard functionality. As an example, the WizardWizard 124 is used to guide the user through the steps necessary to define and create the objects that define one or more subwizards that make up that make up the target wizard.

After it has created the target wizard skeleton, WizardWizard 124 passes control to WizardDesigner 126. WizardDesigner 126 then specializes the target wizard skeleton. This typically involves adding attributes to the target wizard skeleton, defining relationships between these attributes, adding additional GUI elements to the target wizard, and defining the data that will be used by the code generation class of the target wizard. In accordance with the preferred embodiment, the WizardDesigner 126 guides the developer through this process of specializing the target wizard skeleton.

When the user of the WizardDesigner 126 has fully specialized the target wizard skeleton, the source representation of the target wizard skeleton is then stored in a default working directory for final tuning.

WizardWizard 124 and WizardDesigner 126 can both use WizardMetaDataManager 128 to persist and retrieve meta data for target wizards. The storage of meta data allows the specialized target wizard skeleton to be used again to create additional target wizards. In particular, the stored meta data can be used as a starting point by the WizardWizard 124 for the creation of a wizard skeleton The stored meta data can also be used to by the WizardDesigner 128 to create additional target wizards from the stored meta data. In this way, a developer can quickly and easily reuse existing meta data to create and specialize additional target wizards.

In the preferred embodiment, the WizardWizard 124, WizardDesigner 126, WizardMetaDataManager 128 and Target Wizard 129 are all implemented to work within an object-oriented Wizard framework the defines the basic elements of a wizard. This framework defines the core functions of the solution, those elements that are required and cannot be extended by developer. The framework also defines extensible functions of the solution, those that can be customized and extended by the developer. The customization/extension quality of framework mechanisms is extremely valuable because the cost of customizing or extending a framework is much less than the cost of a replacing or reworking an existing solution.

Figure 10:
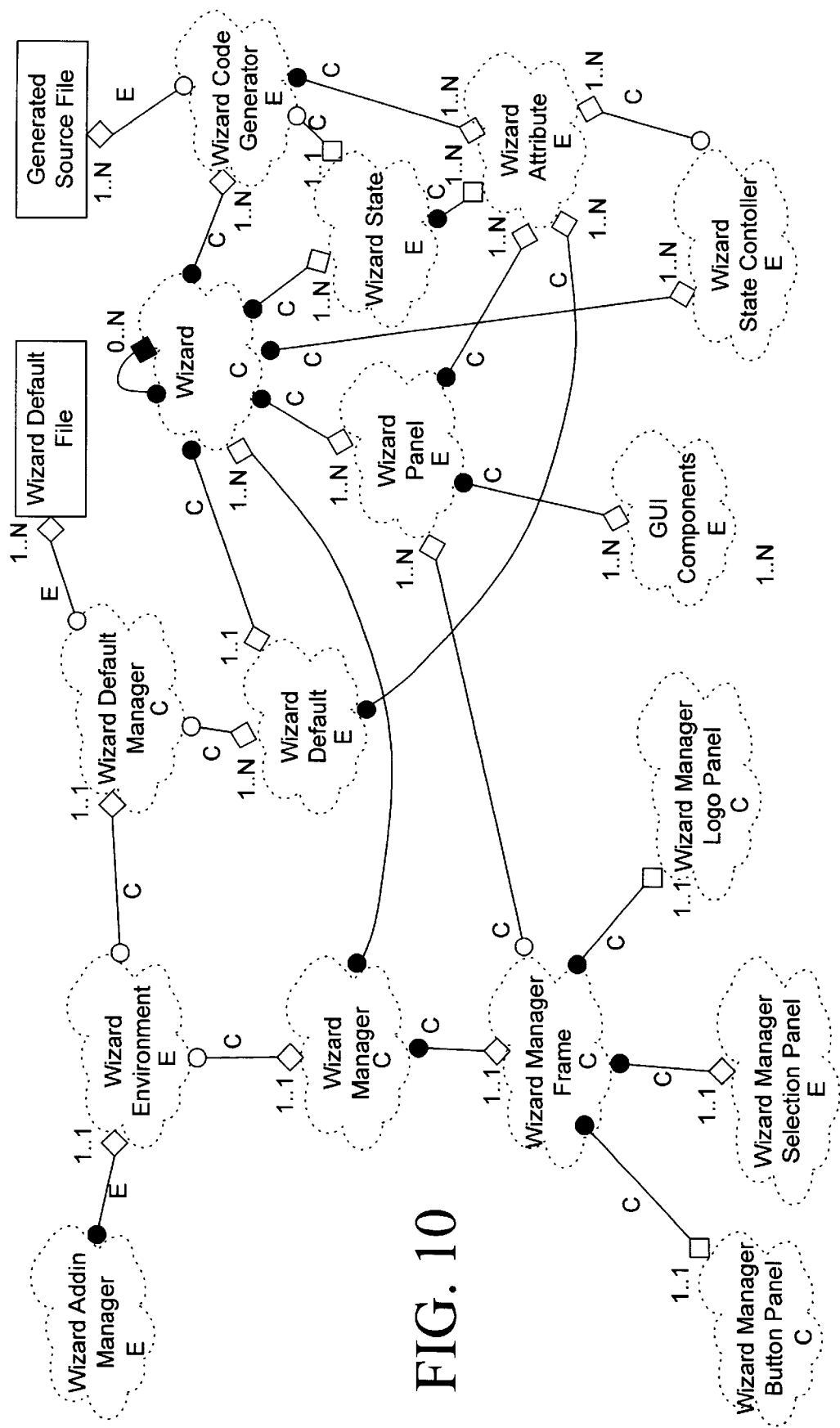
FIG. 10 is a class diagram of a component based wizard framework in accordance with the preferred embodiment.

Turning briefly to FIG. 10, the object-oriented class diagram illustrates the fundamental classes and relationships that make up the component based Wizard Framework. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

In FIG. 10, classes are represented by an irregularly shaped, dashed-line icon commonly referred to as a cloud. Core classes are indicated by a "C" and extensible classes are indicated by an "E". The connecting lines between classes indicate the nature of the relationships between them. Thus, connections between the boxes in FIG. 10 represent relationships between the various mechanisms. Again, core relationships are indicated by a "C" and extensible relationships are indicated by an "E". A solid connecting line with no ends represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of class relationships is called an aggregation relationship, which denotes an association between a whole and its parts or attribute classes. In notation, an aggregation relationship is indicated between a whole class (owner) and an attribute class connected with an association line by a solid circle at the whole class end, with an attribute class at the other end. A refinement in aggregation is the type of containment. The type of containment determines how the classes are aggregated together. There are two types of containment, containment by reference where the whole class includes a reference to the attribute class, and containment by value where the whole class includes a copy of the class in itself. In notation, containment by a reference is indicated by an open square at the attribute end. Containment by value is indicated by a solid square at the attribute end.

Another refinement of class relationships is cardinality. Cardinality represents the number of instances of a class related to another. Cardinality is typically one-to-one, one-to-many, or many-to-many. In FIG. 10, 1 . . . 1 indicates a one-to-one cardinality, meaning there is typically one instance of the class, and 1 . . . N indicates a one-to-many cardinality, meaning there can be multiple instances of the class.

The Wizard framework illustrated in FIG. 10 includes a WizardAddinManager class, a WizardEnvironment class, a WizardManager class, a WizardManagerFrame class, a WizardManagerButtonPanel class, a WizardManagerSelectionPanel class, a WizardManagerLogoPanel class, a WizardDefaultManager class, a WizardDefault class, a Wizard class, a WizardPanel class, a WizardState class, a WizardAttribute class, a WizardStateController class, a GUI Components class, a Wizard Default File and a Generate Source file.

The WizardManager class, the WizardManagerFrame class, the WizardManagerButtonPanel class, the WizardManagerLogoPanel class, the WizardDefaultManager class, and the Wizard class are core classes. These classes define the core functions of the solution, and are thus required and cannot be extended by developer.

The WizardAddinManager class, the WizardEnvironment class, the WizardManagerSelectionPanel class, the WizardDefault class, the WizardPanel class, the WizardState class, the WizardAttribute class, the WizardStateController class, the GUI Components class are all extensible classes. These classes can be customized and extended by the developer to facilitate the extensible nature of the solution. For example, this allows new types of wizard state attributes to be added, causing a ripple effect across many of the extensible framework classes.

The WizardEnvironment class, the WizardManager class, the WizardManagerFrame class, the WizardManagerButtonPanel class, the WizardManagerSelectionPanel class, the WizardManagerLogoPanel class, the WizardDefaultManager class, the Wizard class, the WizardState class, the WizardDefault class, the WizardStateController Class, the WizardPanel class, the WizardAttribute class define the attributes of a target wizard created in accordance with the preferred embodiment. In particular, in the preferred embodiment the WizardWizard 124 and the WizardDesigner 126 serve to guide a developer through the process of instantiating and specializing the objects that make up target wizard from these classes in the Wizard framework.

The WizardAddinManager class defines object to support the connection of the target wizard into the integrated development environment. For example, the tool interface for IBM's VisualAge for Java (IDE) or the addin functionality of Inprise's JBuilder IDE. These objects thus preferably include the behavior needed for the target wizard to run in its intended environment.

The WizardEnvironment class defines objects which act as the integration interface between the wizard being built and its controlling integrated development environment (IDE). Typically, a developer will need to some direct coding of the WizardEnvironment object to facilitate its interaction with the application programming interfaces of the IDE. Potentially, the IDE will require the WizardEnvironment class to inherit behavior from classes provided by the IDE. For example, in Inprise's JBuilder there are API's that would allow the target wizard to programmatically get the context of the project and/or package for what the user is currently viewing in the IDE.

As seen in FIG. 10, the objects from this class preferably reference the WizardManager and WizardDefault objects to hold an maintain these objects. The class preferably includes constructor methods to WizardEnvironment objects for a specified wizard name and/or from specified existing meta data. The class also preferably includes a describe content method used to export meta data from the class objects.

The WizardManager class defines objects which control the execution of multiple subwizards within the target wizards. This class also references the GUI elements making up the overall target wizard. This class preferably includes constructor methods for creating a new WizardManagerFrame object, a new WizardManagerButtonPanel object, a new WizardManagerSelectionPanel object, and a new WizardManagerLogoPanel object, and constructor methods that creating these objects from specified existing meta data. These constructor methods would call corresponding constructor methods on the corresponding class. This class also preferably includes an AddWizard( ) method for adding new subwizards to the overall wizard skeleton. This class also preferably includes methods for launching the overall wizard, and launching selected subwizards. The class also preferably includes a describe content method used to export meta data from the class objects.

The WizardManagerFrame class provides the exterior portion of the target wizard interface. This class would typically define standard GUI elements such as slider bars, minimize and maximize buttons, a name header, etc. The class preferably includes constructor methods to create new instances of this class and instances from specified meta data. The class also preferably includes a describe content method used to export meta data from the class objects.

The WizardManagerLogoPanel class provides the "logo" portion of the target wizard interface. This portion would typically be used alert the user to the name and purpose of the target wizard. The class preferably includes constructor methods to create new instances of this class and instances from specified meta data. The class also preferably includes a describe content method used to export meta data from the class objects.

The WizardManagerButtonPanel class provides the a panel with a plurality of buttons for use on the target wizard interface. These buttons would typically include standard GUI interface buttons, such as BACK, NEXT, FINISH, CANCEL and HELP. The class preferably includes constructor methods to create new instances of this class and instances from specified meta data. The class also preferably includes a describe content method used to export meta data from the class objects.

The WizardManagerSelectionPanel class provides the a GUI interface panel with dynamically updated content to allow a user of the target wizard to select from a list of available subwizards. Preferably, the AddWizard( ) method on the WizardManager adds new subwizards to the displayed list when they are added to the target wizard. The class preferably includes constructor methods to create new instances of this class and instances from specified meta data. The class also preferably includes a describe content method used to export meta data from the class objects.

The WizardDefaultManager class provides the object that controls the interactions between WizardDefault objects for all subwizards in the overall target wizard. The WizardDefault objects are instances of the WizardDefault class created to reference default attributes, with one instance being created for each distinct subwizard. WizardDefaultManager objects thus have a one-to-one relationship with the WizardEnvironment object and a one-to-many relationship with the instances of WizardDefault class. These classes preferably include constructor methods to create new instances of the classes and instances from specified meta data. The WizardDefault class also preferably includes methods to add, delete, get and set default attributes, and a describe content method used to export meta data from the class objects. The actual data for the default attribute is stored in an instance of the WizardAttribute class, described in more detail below.

The Wizard class provides objects to list panels in subwizard and their associated panel flow order. The Wizard class preferably defines constructor methods that call to create new WizardState objects, new WizardStateController objects, new WizardDefault objects and new WizardCodeGenerator objects for each new subwizard when called by the WizardWizard. The Wizard class also preferably includes methods to add new panels to a subwizard and set panel flow when called by the WizardWizard and WizardDesigner. he class also preferably includes a describe content method used to export meta data from the class objects.

The WizardAttribute class provides objects to store state, default, panel and code generator attributes. This class can be implemented as an abstract class, with specific inherited classes for each of these specific types. The WizardAttribute objects preferably include getter methods to get the contents of the object and setter methods to set contents of the object, which are called by the corresponding WizardState, WizardDefault, WizardPanel, and WizardCodeGenerator objects. These objects also include constructor methods that are also called by the WizardState, WizardDefault, WizardPanel, WizardCodeGenerator objects when new attributes need to be created. The class also preferably includes a describe content method used to export meta data from the class objects.

The WizardState class provides objects used to reference and contain a plurality of WizardState attributes, with the WizardState attributes stored in objects instantiated from the WizardAttribute class. The WizardState class preferably includes constructor methods to create new instances of the classes and instances from specified meta data, and methods to add, delete, set and get wizard state attributes, with these methods creating, deleting, and adding and getting values from WizardAttribute class objects.

The WizardPanel class defines objects that provide the GUI interface for the target wizard. The WizardPanel class references the GUI component class to receive data from the user and store it in a WizardPanel attribute. (Is that right—or the otherway around?) The WizardPanel class preferably includes constructor methods to create panels, and methods to add, delete, get and set WizardPanel attributes. The methods to add, delete, get and set would then call the corresponding method on the WizardAttribute class. The class also preferably includes a describe content method used to export meta data from the class objects.

The WizardStateController class provides objects that stores and maintain the relationships between WizardState attributes, WizardDefault attributes, and WizardPanel attributes. This object preferably includes constructor methods and methods to add relationships between attributes, delete relationships between attributes, and retrieve relationships. The class also preferably includes a describe content method used to export meta data from the class objects.

The WizardCodeGenerator class provides objects that WizardState attribute data and use it to establish a context from which to generate code. The WizardCodeGenerator class preferably includes constructor methods and a generate( ) method for producing output. The WizardCodeGenerator class preferably references data in CodeGenerator attributes stored in WizardAttribute objects. Typically, the implementation of the generate method will require some hand coding. The class also preferably includes a describe content method used to export meta data from the class objects.

The GUI Components class provides objects to that define GUI elements for receiving data from the target wizard user. For example, the GUI components can provide text entry fields, drop down lists, tables or other GUI elements that are used by the target wizard user to enter data. Typically, the GUI components class would use standard GUI elements for the target environment. The data entered into the GUI components is referenced by the WizardPanel object, which then stores the data as a WizardPanel attribute using the WizardAttribute class.

The Wizard Default File can be used to store general properties such as a Java Properties file or a Windows . . . ini file. This file would preferably include a reference to the wizard that the default is for and the attribute the default is for. The data from this file can be retrieved WizardDefault manager to fill in a WizardDefault object. The Generated Source file provides a storage location for output from WizardCodeGenerator object.

Typically, for each overall target wizard created, one instance of the WizardEnvironment class, the WizardManager class, the WizardManagerFrame class, the WizardManagerButtonPanel class, the WizardManagerSelectionPanel class, the WizardManagerLogoPanel class and the WizardDefaultManager class are created (as illustrated by their one-to-one cardinality). Likewise, for each subwizard in the target wizard, one or more objects from the WizardDefault class, the Wizard class, the WizardCodeGenerator class, the WizardState class and the WizardStateController class are created. Furthermore, multiple instances of the WizardPanel class, GUI components class and WizardAttribute class are created. For example, an instance of the WizardAttribute class is preferably created for each state, default and panel attribute. In the preferred embodiment the WizardWizard 124 and the WizardDesigner 126 serve to guide a developer through the process of instantiating and specializing the objects that make up target wizard from these classes in the Wizard framework. The details of these objects will thus be discussed in more detail with reference to FIG. 5 and exemplary TargetWizard 129.

While the classes and categories within Wizard Framework have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework).

In the preferred embodiment the WizardWizard 124 and WizardDesigner 126 provides a programming environment that can be used to easily and effectively create new target wizards as instantiations of the component based wizard framework. The component based wizard framework thus defines all the classes and objects that constitute a target wizard. For example, in the preferred embodiment the wizard framework defines state, default and panel objects that are used to store data values obtained from a defaults file or a wizard user which are then used in the code generation phase of a wizard execution. The framework also preferably includes objects to define and implement the GUI elements used by the present invention. GUI elements would typically include frame, panel and button objects. The frame objects define the exterior of the GUI interface, and would typically include standard GUI elements such as slider bars for scrolling through the interface, a header, and buttons to minimize and maximize the size of the interface. The panel objects define the majority of the interface, and typically include components such as text, entry fields, buttons, lists, pull-down menus, etc. These components would serve to instruct the developer, provide options to the developer, receive input from the developer (i.e., in the form of text, or selected entries), etc. The button objects define one or more standard GUI buttons that would be typically be included in the panels. Example of buttons would include "next", "back", "cancel" and "help".

To further illustrate the details of the wizard object oriented framework solution being used, a description of the significant objects in the preferred completed target wizard will now be discussed, followed by a description of the preferred embodiment WizardWizard and WizardDesigner which are used to create and specialize the target wizard using the Wizard Framework.

Figure 3:
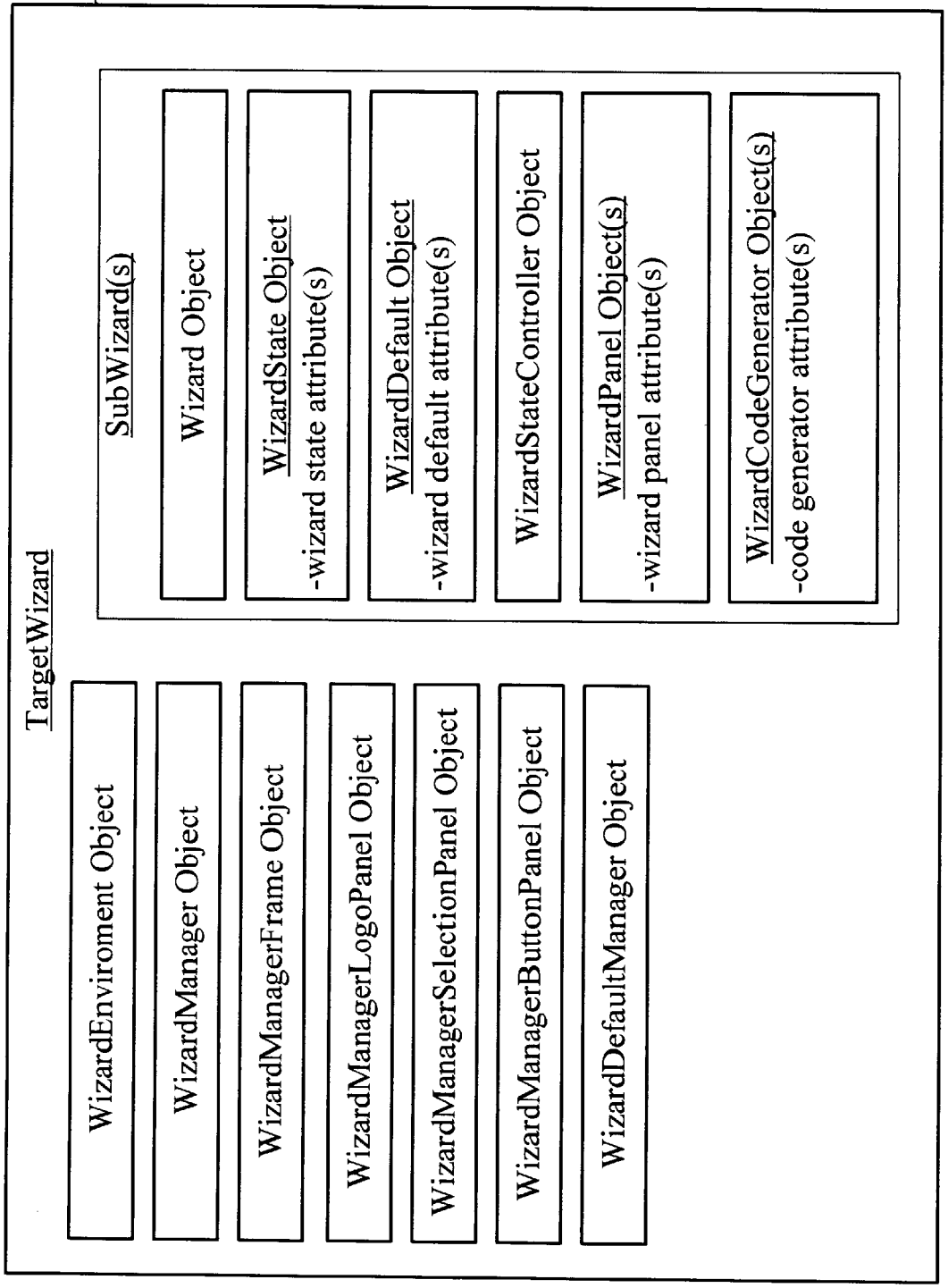
FIG. 3 is functional block diagram of a Target Wizard in accordance with the preferred embodiment.

Turning now to FIG. 3, the preferred implementation of a Target wizard 129 is illustrated in more detail. As explained, in the preferred embodiment the Target wizard 129 is an instantiation of the component based Wizard framework as created and specialized by the preferred embodiment WizardWizard and WizardDesigner. The preferred embodiment can be adapted to create wizards that work in many different computer platforms. The elements illustrated in FIG. 3 are exemplary of the type of elements that would typically be created for most computing platforms, but those skilled in the art will recognize that modifications and deletions may be made.

Target wizard 129 is preferably implemented as an overall target wizard and one or more subwizards. This allows increased flexibility by allowing the adding and deleting of subwizards as functionality requirements change. If only one function is required, the target wizard 129 can simply be implemented with a single subwizard. The objects in the preferred implementation of the overall target wizard include a WizardEnvironment object, a WizardManager object, a WizardManagerFrame object, a WizardManagerLogoPanel object, a WizardManagerSelectionPanel object, a WizardManagerButtonPanel object, and a WizardDefaultManager object. These objects are preferably instantiations from the corresponding classes in the Wizard framework.

The WizardEnvironment object performs three main functions. It acts as the integration interface between the target wizard and its eventual controlling integrated development environment, such as IBM's Visual Age for Java. The WizardEnvironment object also holds and maintains the WizardManager object and the WizardDefault Manager. The WizardEnvironment preferably includes constructor methods and describe content methods which are used by the WizardMetaDataManager in the wizard save and restoring actions. The WizardManager object controls the execution of the one or more subwizards that make up the target wizard. It includes the definition of which subwizard is executed based on which subwizard is selected by the wizard user. The WizardDefaultManager is also responsible for retrieving the wizard default information from the persistent storage form (i.e., file system) filling the WizardDefault objects with the retrieved data. It is also responsible for storing the updated default information to be used for the next use of the wizard.

The WizardManagerFrame object provides a GUI element that acts to encapsulate the panels used as the user interface as part of the target wizard. The WizardManagerLogoPanel object provides a GUI element that can be used as the header for the user interface. The logo is typically configured to be displayed in the frame above the current panel. The WizardManagerButtonPanel object preferably defines a set of standard buttons that are used to navigate between the collection of panels constituting the target wizard user interface. For example, GUI buttons such as BACK, NEXT, FINISH, HELP can be defined using the WizardManagerButtonPanel objects and inserted into the frame to provide part of the user interface. The WizardManagerSelectionPanel object provides a GUI panel to facilitate the user selecting one of the subwizards for execution. This panel would typically only need to be used if the Target wizard 129 includes multiple subwizards.

Each subwizard in the Target wizard 129 preferably includes a Wizard object, a WizardState object, a WizardDefault object, a WizardStateController object, WizardPanel object(s), and a WizardCodeGenerator object. The Wizard object includes a list of panels that comprise the subwizard, and the corresponding panel flow order.

The WizardPanel object(s) define the GUI panel(s) used by the corresponding subwizard, and the attributes defined for each panel. The WizardPanel object(s) preferably include methods to add, delete, get and set WizardPanel attributes. Typically, a WizardPanel object will be defined for each logical step that the subwizard will guide the target wizard user through. WizardPanel attributes are preferably added for such things each entry fields, selection lists, and other GUI elements that allow the target wizard user to input and/or select data. These WizardPanel attributes are preferably stored in a corresponding instance of the WizardAttribute class. The wizard panels are preferably displayed with the frame object(s) and button object(s) to make up a total GUI interface for the target wizard.

The WizardState object maintains the set of WizardState attributes defined and created with the WizardDesigner. The WizardState object preferably includes methods to add, delete, set and get wizard state attributes. These WizardState attributes are preferably stored in a corresponding instance of the WizardAttribute class. The WizardState attributes will be used to get and channel data from the default attributes and/or input from the wizard user and deliver those attributes to the code generation object.

The WizardDefault object stores the plurality of WizardDefault attributes defined and created with the WizardDesigner. The WizardDefault object preferably includes methods to add, delete, get and set wizard defaults attributes. These WizardDefault attributes are preferably stored in a corresponding instance of the WizardAttribute. The WizardDefault attributes allow a wizard developer to set default values for any data needed by the target wizard. The target wizard can be designed to allow the user to reuse the values from WizardDefault attributes or enter new values. The selected values are then sent to the WizardState object in the form of WizardState attributes, where they can be delivered to the code generation object.

The WizardStateController object stores and maintains the relationships between WizardState attributes, WizardDefault attributes, and WizardPanel attributes. This object preferably includes methods to add relationships between attributes, delete relationships between attributes, and retrieve relationships. In the preferred embodiment, the WizardDesigner 126 guides the developer through the process of defining relationships between pairs of attributes. For example, a developer can define a default value for a particular attribute in the WizardState Object by relating a WizardDefault attribute with the WizardState Object attribute. In the same way, the developer can allow the user to replace that default value with the a new value by relating that WizardState Object to a WizardPanel entry field attribute. The WizardStateController keeps track of these relationships and updates the data in the WizardState Object as necessary.

The WizardCodeGenerator object takes data from the WizardState object and uses it to establish a context from which to generate code. The WizardCodeGenerator object can comprise any suitable generator technology that can access the state information captured in the WizardState object. For example, a Java implemented code generator can be used to create Java source code. The WizardCodeGenerator can also be implemented to provide data conversion between different languages and different data representations.

Typically, the WizardCodeGenerator object would include a generate( ) method that takes the CodeGenerator attribute values and produces the output needed from the target wizard. Typically, the implementation of this method would require some direct coding to fully perform the desired function. For example, if the target wizard is designed configure a peripheral device (e.g., printer, modem etc) the WizardCodeGenerator generate( ) method would need coded directly to take the code generator attributes and create a suitable configuration routine that can complete the configuration of the peripheral device. Although this description refers to the object as a WizardCodeGenerator, it should be understood that this term is meant to include other entities that may simply perform or execute code instead of actually generating new code.

Figure 4:
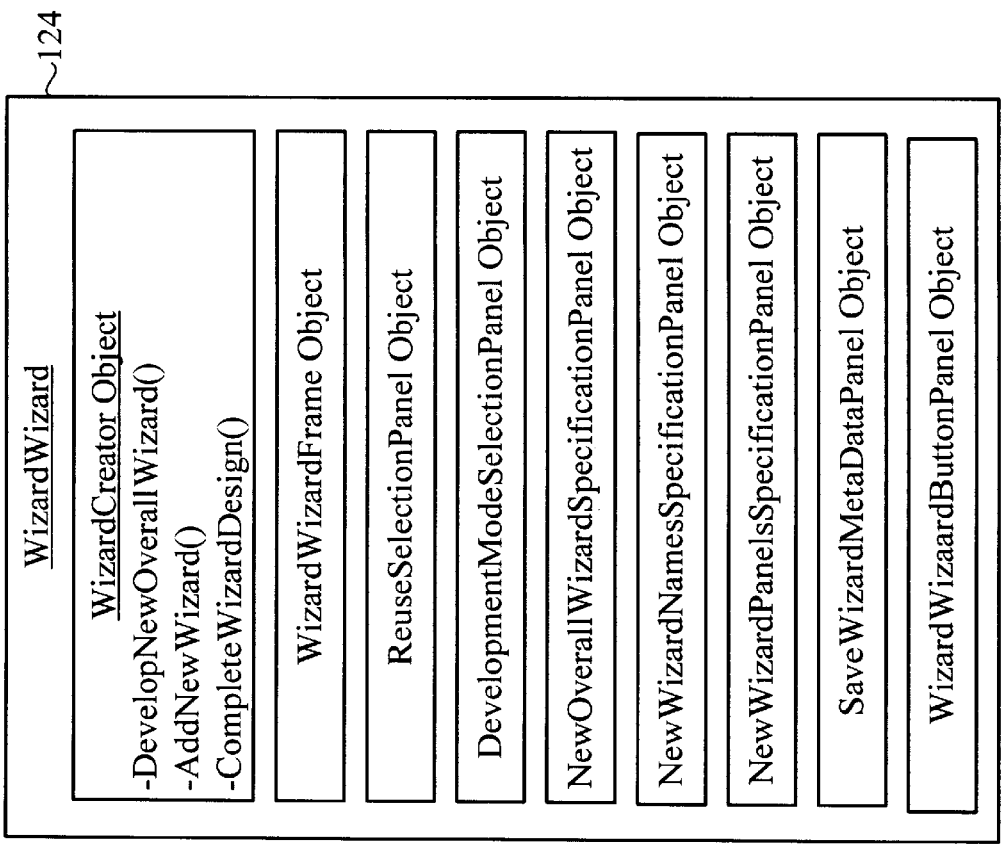
FIG. 4 is functional block diagram of a WizardWizard in accordance with the preferred embodiment.

Turning now to FIG. 4, the preferred implementation of WizardWizard 124 is illustrated in more detail. WizardWizard 124 is preferably implemented using object-oriented programming techniques. Thus, the functionality of WizardWizard 124 is defined by a plurality of objects, each object having defined methods and data. It should be noted that in the preferred embodiment, both the WizardWizard 124 and WizardDesigner 126 are implemented using classes and objects similar to those in the Wizard framework that are used as the basis for target wizards. For example, both the WizardWizard 124 and the WizardDesigner 126 use a plurality of panel objects, frame objects, button objects to create a user interface.

In the preferred embodiment, the WizardWizard 124 implementation includes a WizardCreator object, a WizardWizardFrame object, a ReuseSelectionPanel object, a WizardWizardButtonPanel object, a DevelopmentModeSelectionPanel object, a NewOverallWizardSpecificationPanel object, a NewWizardNameSpecificationPanel object, a NewWizardPanelSpecificationPanel object, and a SaveWizardMetaDataPanel object.

The WizardCreator object provides the basic functionality of creating a skeleton target wizard and preferably includes a DevelopNewOverallWizard( ) method, an AddNewWizard( ) method, and a CompleteWizardDesign( ) method. The DevelopNewOverallWizard( ) method provides the logic needed for the initial creation of a new target wizard skeleton. The AddNewWizard( ) method facilitates the creation of one or more subwizards that can be added to the target wizard. The CompleteWizardDesign( ) method completes the target wizard skeleton and calls the WizardDesigner to complete the target wizard.

The WizardWizardFrame object provides a graphical border that encapsulates these various panels and may be used to provide additional information to the user. The WizardWizardFrame object can include a wide range of GUI elements, including such components as slider bars for scrolling through the interface, a header, and buttons to minimize and maximize the size of the interface. Typically, a single WizardWizardFrame can be used to contain and work with all panels in the WizardWizard and WizardDesigner, although it may be desirable in some cases to use different frames to hold different panel objects. The WizardWizardButtonPanel object is used to provide GUI panels for navigation and data entry.

The ReuseSelectionPanel object is used to prompt the developer to select whether to create a new target wizard or modify and tune an existing target wizard. When activated, it displays an interface to user in the WizardWizardFrame object. The DevelopmentModeSelectionPanel object is used to prompt the user to select a process development mode, where the developer is guided through each step needed to create a target wizard skeleton, or a power development mode, where the developer uses a visual construction environment to put together a subset of the target wizard skeleton.

If the developer selects either process mode or power mode for creating a new target wizard, the WizardWizard takes the developer through the NewOverallWizardSpecificationPanel, the NewWizardNameSpecificationPanel, the NewWizardPanelSpecificationPanel, and the SaveWizardMetaDataPanel. If the developer selects power mode to modify an existing wizard, the WizardWizard then takes the developer to a visual constructor environment where they select these parameters.

The NewOverallWizardSpecificationPanel object is used to prompt the user to select a name for the new overall wizard. The NewWizardNameSpecificationPanel object is used to prompted for the number and names of each of the subwizards that are to be created as part of the new overall target wizard. The NewWizardPanelSpecificationPanel object is used to prompt the developer to select the number of panels that are to be created for each of the subwizards that make up the new overall target wizard. The SaveWizardMetaDataPanel is used to prompt the developer to select whether or not to save the target wizard meta data so that it can be used again at a later date to create additional target wizards.

Thus, WizardWizard 124 includes the objects and methods needed to define and create a target wizard skeleton. This target wizard skeleton includes all the basic objects needed to define an implement the target wizard. The meta data for the target wizard skeleton can be saved by the WizardMetaDataManager 128 for reuse and/or later retuning. The target wizard skeleton is then passed to the WizardDesigner 126, where it can be further defined and specialized for a particular application.

Figure 5:
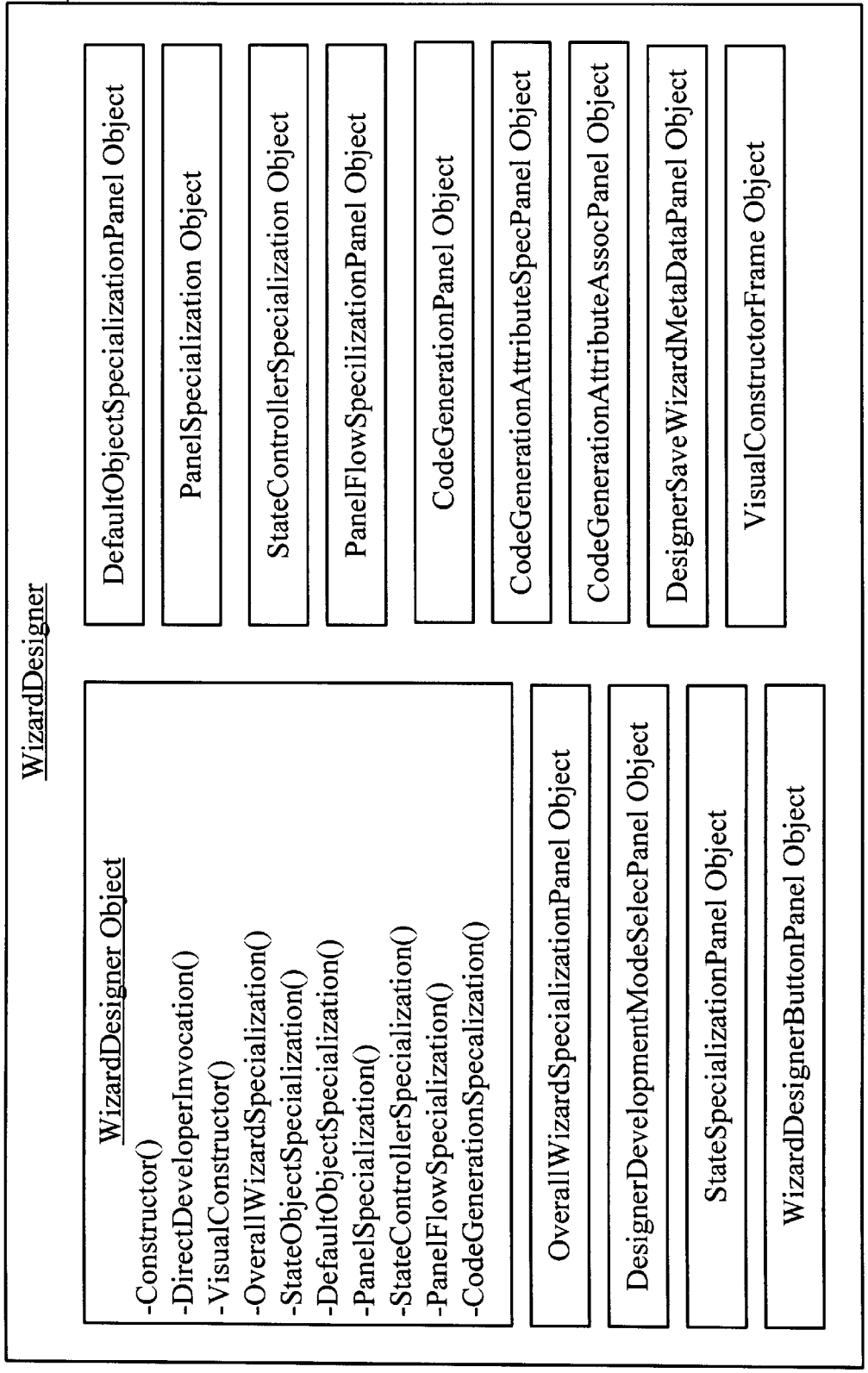
FIG. 5 is functional block diagram of a WizardDesigner in accordance with the preferred embodiment.

Turning now to FIG. 5, the preferred implementation of WizardDesigner 126 is illustrated in more detail. WizardDesigner 126 is also preferably implemented using object-oriented programming techniques. As discussed above, the WizardDesigner 126 can be used to specialize a newly created target wizard skeleton or modify an existing target wizard. In the preferred embodiment, the WizardDesigner 126 implementation includes a WizardDesigner object, a OverallWizardSpecializationPanel object, a DesignerDevelopmentModeSelectionPanel object, a StateSpecialization- Panel object, a DefaultObjectSpecializationPanel object, a PanelSpecificationPanel object, a StateControllerSpecialization object, a PanelFlowSpecilizationPanel object, a CodeGenerationPanel object, a CodeGenerationAttributeSpecializationPanel object, a CodeGenerationAttributeAssociation Panel object, a WizardDesignerButtonPanel object is used to provide GUI panels for navigation and data entry. DesignerSaveWizardMetaDataPanel, and a VisualConstructorFrame object.

The WizardDesigner object provides the basic functionality of taking a skeleton wizard or previously created target wizard and specializing it to perform a particular task. The WizardDesigner object preferably includes a Constructor( ) method, a DirectDeveloperInvocation( ) method, a VisualConstructor( ) method, an OverallWizardSpecialization( ) method, a StateObjectSpecialization( ) method, a DefaultObjectSpecialization( ) method, a PanelSpecialization( ), a StateControllerSpecialization( ) method, a PanelFlowSpecialization( ) and a CodeGenerationSpecalization( ) method.

The Constructor( ) method establishes addressability to the set of objects in the newly created target wizard skeleton or to an existing wizard which has been selected to be modified. The DirectDeveloperInvocation( ) method is called when the WizardDesigner is invoked directly to tune an existing target wizard. This method prompts the user to select the desired development mode, either process or power development mode., using the DesignerDevelopmentModeSelectionPanel object. Again, in process development mode the developer is guided through each step needed to specialize the target wizard, while in power development mode, the developer uses a visual construction environment to specialize the target wizard. If the developer selects process mode, the WizardDesigner 126 takes the developer through the OverallWizardSpecializationPanel, the for each subwizard it takes the developer through the StateSpecializationPanel, the DefaultObjectSpecializationPanel, the WizardPanelSpecializationPanel, the StateControllerSpecializationPanel, the WizardPaneFlowSpecializationPanel, the CodeGenerationSpecializationPanel and the DesignerSaveWizardMetaDataPanel, which are all defined by their corresponding objects. If the developer selects power mode, the WizardDesigner then invokes the visual constructor to modify each subwizard in turn.

The VisualConstructor( ) method is called when the developer selects the power development mode. This method invokes a typical visual constructor which has been extended to include the specifics in support of the target wizard framework.

The OverallWizardSpecialization( ) method displays the panel defined by the OverallWizardSpecializationPanel object, and populates the panel contents with any available Wizard framework data for the target wizard skeleton that is being used. This would typically include a list of the subwizards defined for the target wizard and their names. The OverallWizardSpecification panel gives the developer the option to delete existing subwizards from the overall wizard, rename existing subwizards, and add new subwizards to the overall wizard. When the developer selects to remove a specified subwizard, the OverallWizardSpecialization( ) method removes the corresponding set of Wizard framework objects that define that subwizard. Likewise, the OverallWizardSpecialization( ) method creates a new corresponding set of Wizard framework objects when the user chooses to add new subwizards.

The StateObjectSpecialization( ) method displays the panel defined by the StateSpecializationPanel object, and populates the panel with the Wizard framework data for the subwizard that is being specialized. The panel preferably includes listings of attribute names, attribute types, a description of the attribute, and an indication as to whether the attribute is required or not. Required attributes are those which must have a value in order for the code generator to ultimately execute successfully.

The DefaultObjectSpecialization( ) method displays the panel defined by the DefaultSpecializationPanel object, and populates the panel with the Wizard framework data for the subwizard that is being specialized. The panel preferably includes listings of attribute names, attribute types, a description of the attribute, and an indication as to whether the attribute is required or not.

The PanelSpecialization( ) method displays the panel defined by the PanelSpecialization Panel object, and with the Wizard framework data for the subwizard that is being specialized. The panel includes listings of wizard panel components, their type, and a description of the corresponding attribute.

The StateControllerSpecialization( ) method displays the panel defined by the StateControllerSpecialization Panel object, and with the Wizard framework data for the subwizard that is being specialized. The panel preferably includes listings of the WizardState attributes, WizardDefault attributes, and Panel components defined by the previous methods. The panel allows the developer to define relationships between attributes by allowing the user to select state, default, and panel attributes and relate them. This method further checks to assure that the relationships are valid by checking them against constraints supported by the StateControllerMethod( ). For example, type compatibility checking between attributes is typically performed.

The PanelFlowSpecialization( ) method displays the panel defined by the PanelFlowSpecialization Panel object, and populates the panel object with the Wizard framework data for the subwizard that is being specialized. The panel includes ordered listings of the panels defined for the subwizards of the target. The panel facilitates changing the order of panels in each subwizard by dragging and dropping or manually entering a new order number. This panel facilitates the specification of conditional numbering of the panels for each subwizard.

The CodeGenerationSpecalization( ) method displays the panels defined by the CodeGenerationPanel object, the CodeGenerationAttributeSpecializationPanel object, and the CodeGenerationAttributeAssociationPanel object CodeGenerationSpecializationPanel object. These panels are populated with the panel object with the Wizard framework data for the subwizard that is being specialized. The CodeGeneratioPanel object prompts the developer for the name of the code generator to be invoked and allows the user to select what code generation specialization steps to perform. The CodeGenerationAttributeSpecializationPanel object allows the developer to addnew attributes to the CodeGeneration object, and the CodeGenerationAttributeAssoicationPanel object allows the developer to associate the those attributes with StateObject attributes.

The DesignerSaveWizardMetaDataPanel prompts the user for their desire to save the wizard meta data for future reuse and/or tuning. As will be described in more detail later, if the user selects to save the meta data, the SaveWizardMetaData method is called on the WizardMetaDataManager 128.

Thus, WizardDesigner 124 includes the objects and methods needed to modify and specialize a target wizard skeleton. This includes the definition of panel objects that serve as the GUI for the target wizard, the definitions of state, default and panel attributes that are used to get and process data from the user of the target wizard, and the attributes on the code generation object that are used to establish a context for code generation.

Figure 6:
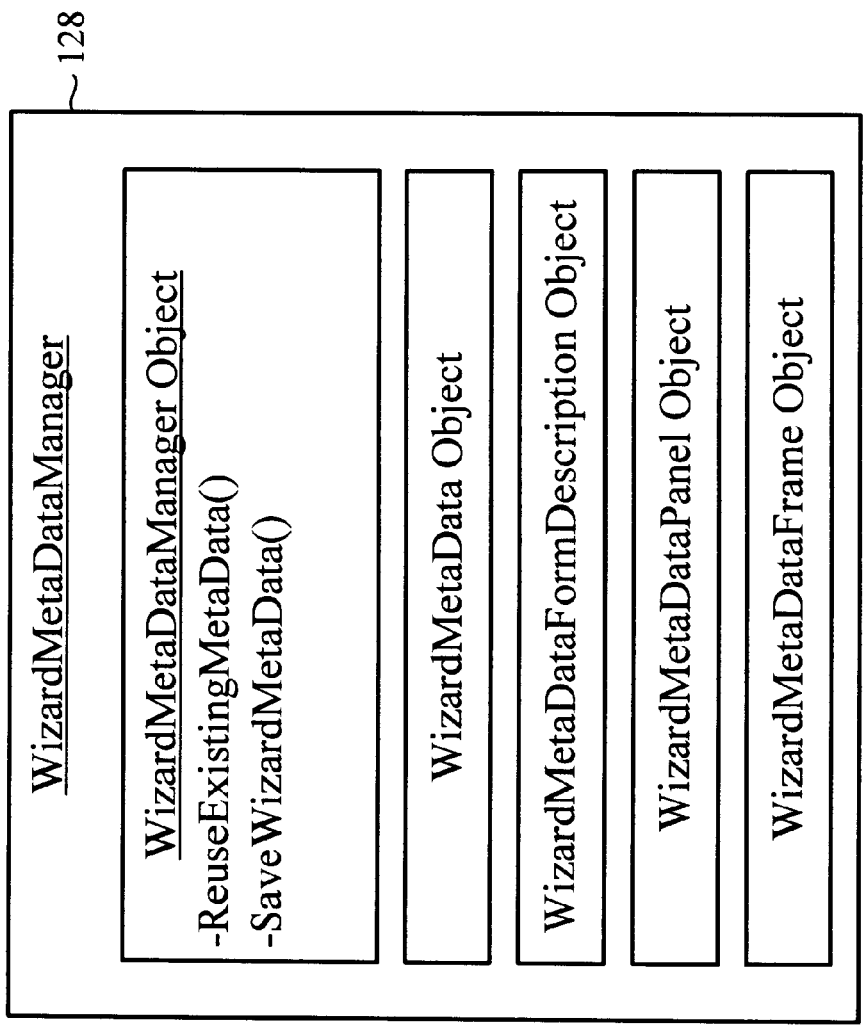
FIG. 6 is functional block diagram of a WizardMetaDataManager in accordance with the preferred embodiment.

Turning now to FIG. 6, the preferred embodiment implementation of the WizardMetaDataManager 128 is illustrated in more detail. As discussed above, the WizardMetaDataManager 128 is used to persist and retrieve target wizard meta data. In the preferred embodiment, the WizardMetaDataManager 128 implementation includes a WizardMetaDataManager object, a WizardMetaData object, a WizardMetaDataFormDescription object, a WizardMetaDataPanel object, and a WizardMetaDataFrame object.

The WizardMetaDataManager object preferably includes a ReuseExistingMetaData( ) method an a SaveWizardMetaData( ). The SaveWizardMetaData( ) displays the WizardMetaDataPanel object which prompts the developer to select the meta data to be stored and specify a wizard meta data file in a form specified by the WizardMetaFormDescription object. The ReuseExistingMetaData( ) method displays the WizardMetaDataPanel and prompts the user to select a set of wizard meta data. The method retrieves the wizard meta data and walks through it to recreate an internal set of wizard framework objects.

The WizardMetaData object includes the actual meta data for the target wizard. This would preferably include all of the components of the target wizard and their interrelationships. The storage would preferably be done in a language neutral format to facilitate ease of restoring. The WizardMetaDataFormDescription object describes the format used for storing the wizard meta data. For example, the wizard metal data could be described using extensible markup language (XML) and an accompanying wizard framework specific document content description. The WizardMetaDataPanel object and a WizardMetaDataFrame object provide the GUI interface to the developer.

Figure 7:
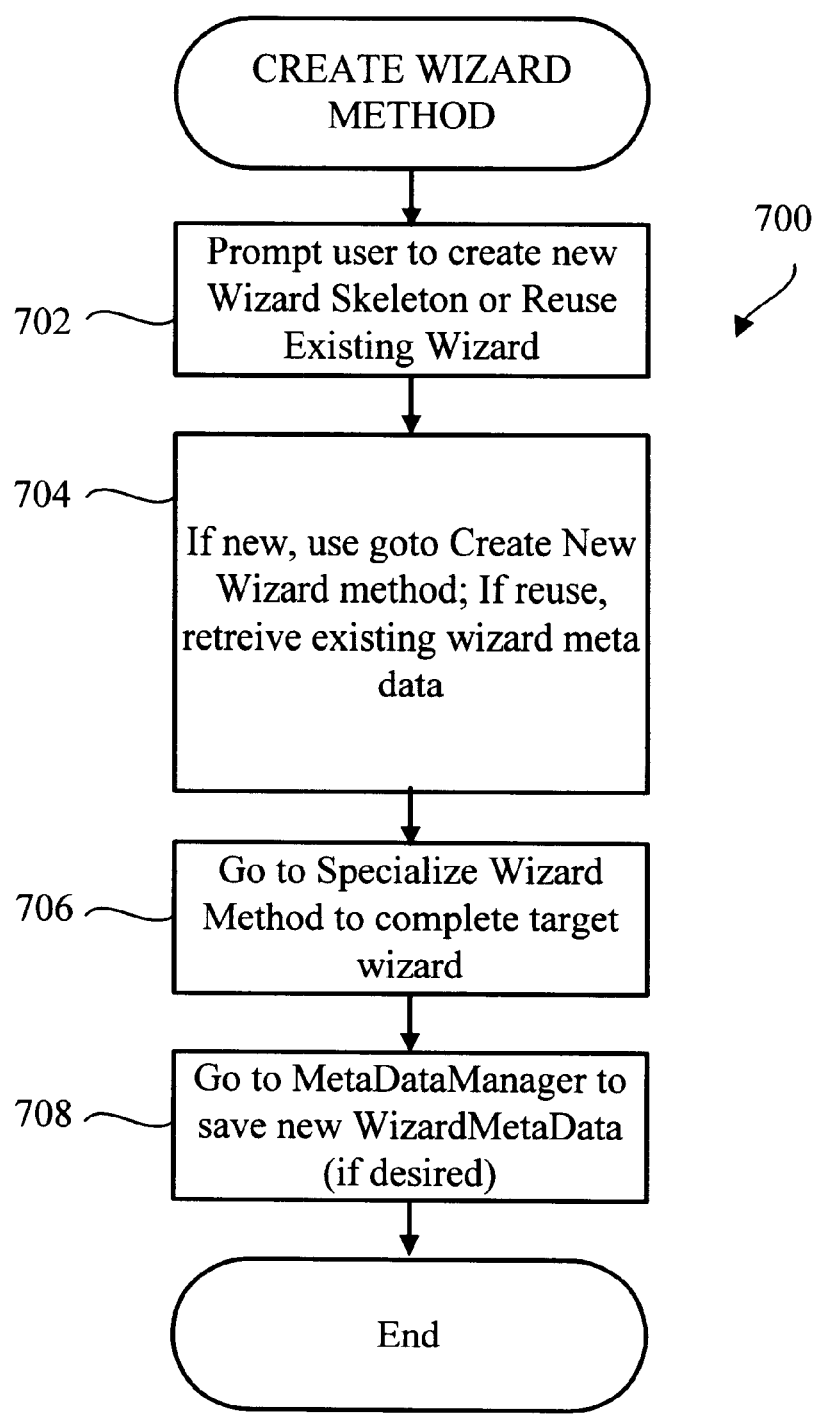
FIG. 7 is a flow diagram illustrating a method for creating wizards in accordance with the preferred embodiment.
Figure 11:
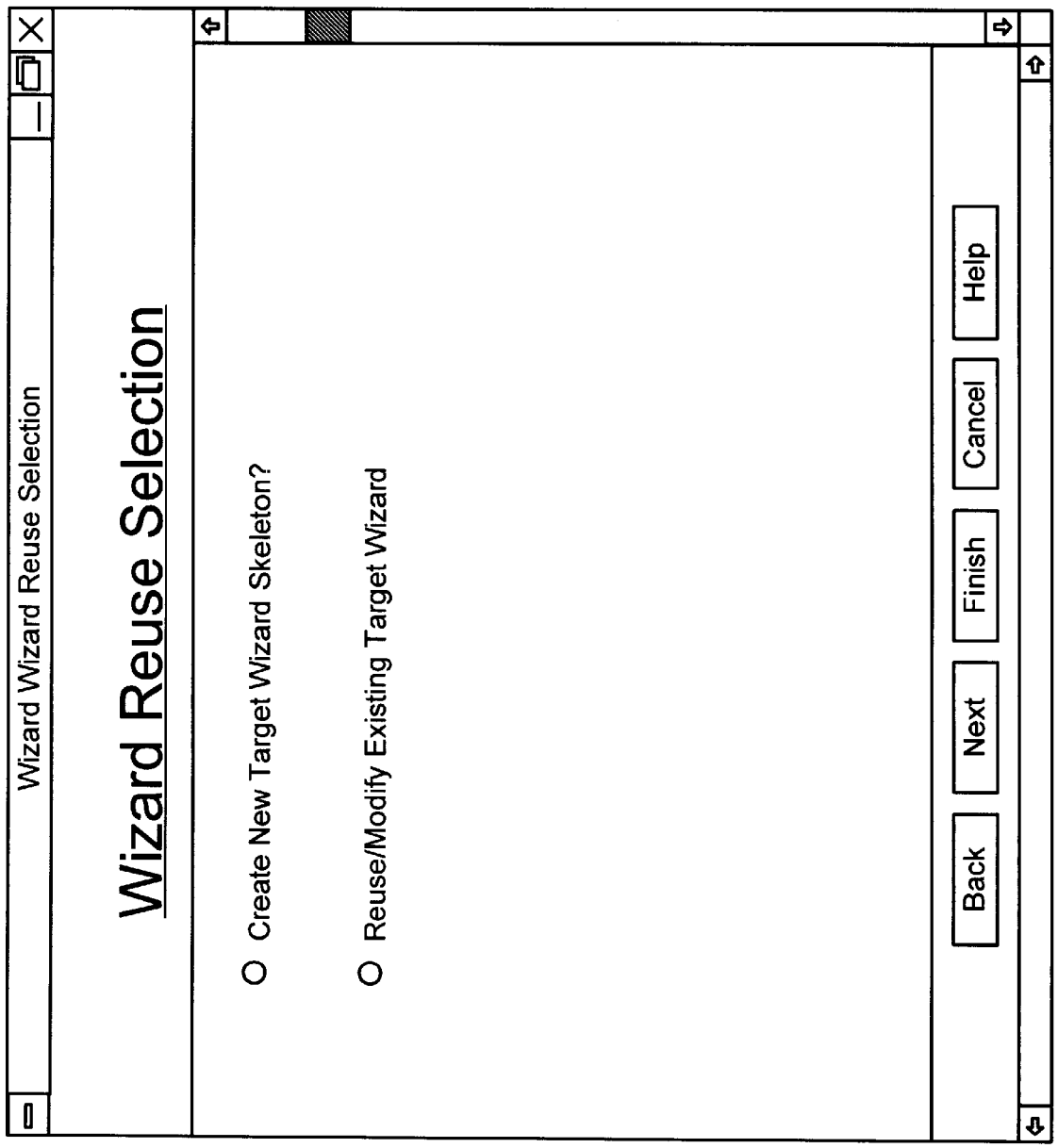
FIGS. 11–16 are block diagrams illustrating exemplary WizardWizard user interface panels in accordance with the preferred embodiment.

Turning now to FIG. 7, a preferred embodiment general method for creating a target wizard is illustrated. The first step 702 is to prompt the user to select whether the target wizard is to be a new target wizard, a reuse of an existing target wizard for which the wizard meta data has been saved. As described above, this is preferably accomplished using the ReuseSelectionPanel. Turning briefly to FIG. 11, an exemplary ReuseSelectionPanel is schematically illustrated. The panel allows the developer to select whether to reuse existing wizard meta data or create an all new target wizard.

Figure 8:
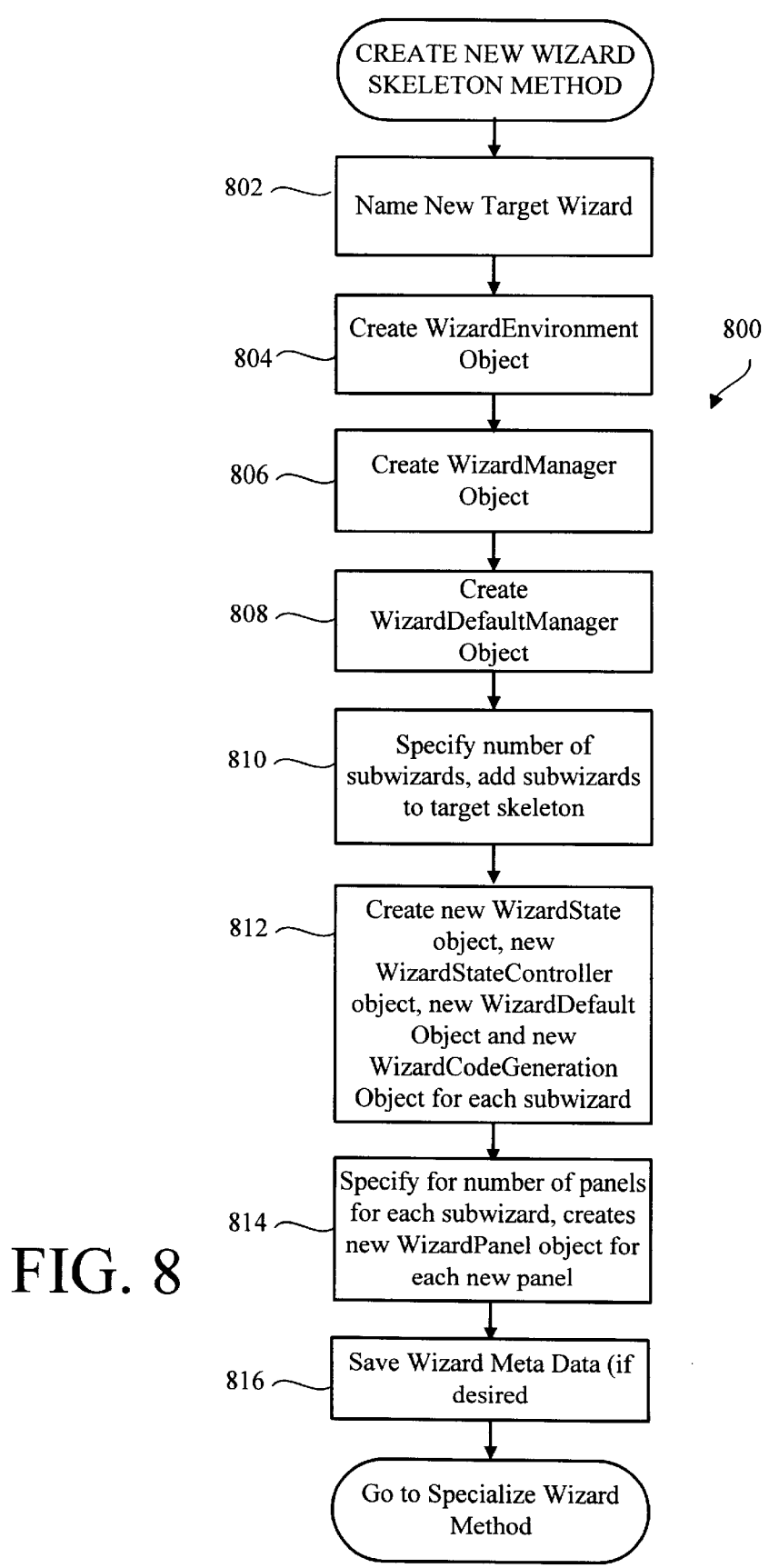
FIG. 8 is a flow diagram illustrating a method for creating a new wizard skeleton in accordance with the preferred embodiment.

If creating a new wizard is selected, the next step 704 is to go to the create new wizard method 800, illustrated in FIG. 8. If the reuse an existing wizard is selected, the Next step 704 is to go to the Modify Existing Wizard method 900, illustrated in FIG. 9. In both cases step 704 defines the target wizard skeleton that is going to be used as the basis for the new target wizard. After the skeleton is defined, the next step 706 is to go the Specialize Wizard Method to complete target wizard. This method defines and specifies the attributes of the new target wizard, and outputs this data in a way that can be used to create a new target wizard. With the new target wizard created and specialized, the next step 708 is to store the target wizard meta data, if desired. Storing the target wizard meta data allows the newly defined target wizard to serve as the basis for future target wizard development.

Figure 12:
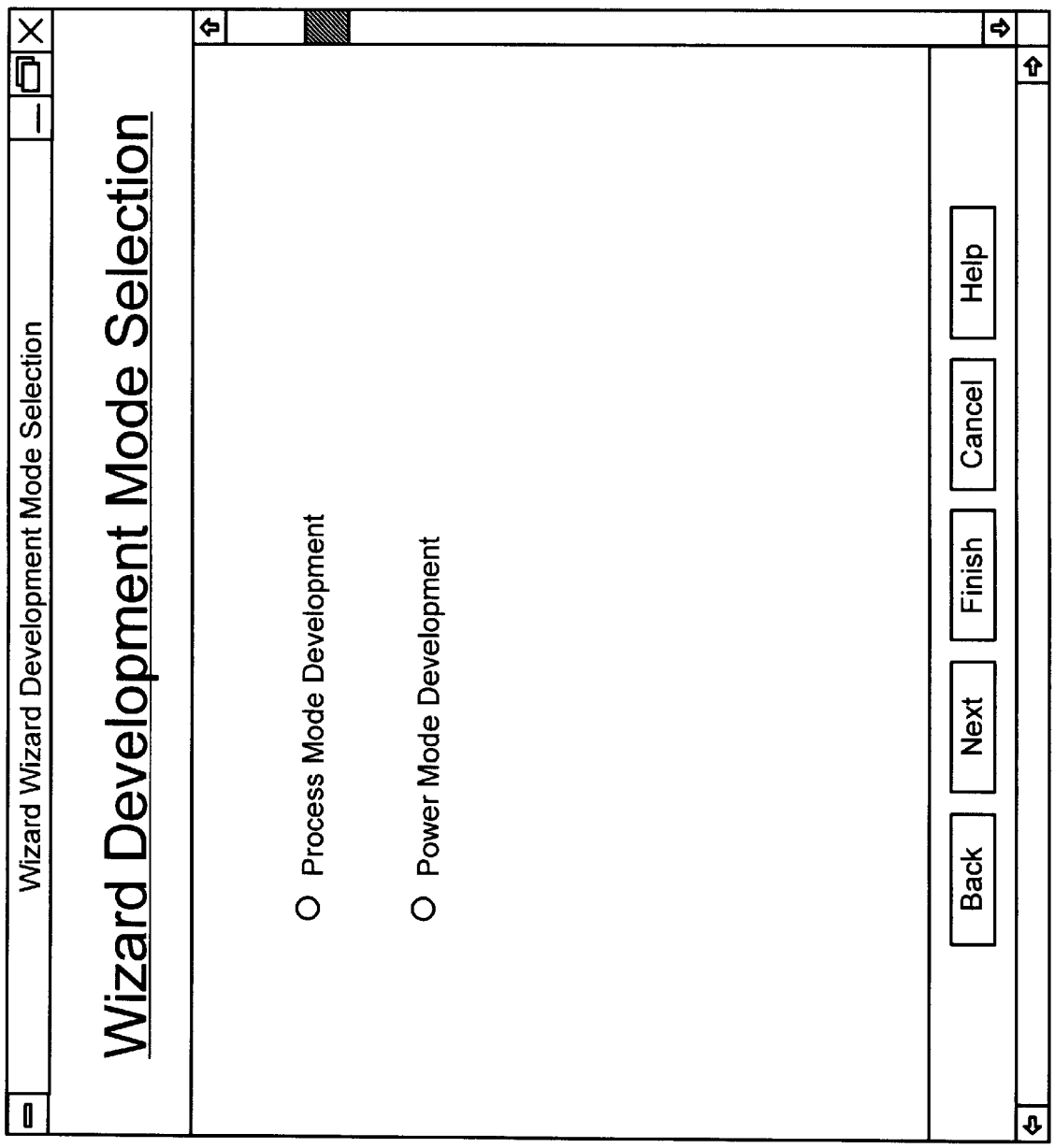

Turning now to FIG. 8, the Create New Wizard method 800 is illustrated in more detail. As discussed above, in the preferred embodiment new wizards can be created using a process development mode or a power development mode. In process development mode, the developer is guided through each step in the process. In power development mode, the developer can define all the parameters in a single visual constructor environment. These two modes those comprise two distinct methods of implementing method 800. Preferably when new wizard is to be created, the developer is prompted to select either power or process development mode with the DevelopmentModeSelection panel. Turning now to FIG. 12, a target wizard user interface that includes an exemplary DevelopmentModeSelection panel is illustrated. By selecting one of the two options, the user can control the operation of the WizardWizard, selecting whether to use power or process development modes. The user interface illustrated in FIG. 12 also includes a frame, defined by a suitable WizardWizardFrame object, and a set of user interface buttons, defined by a suitable WizardWizardButtonPanel object.

Figure 13:
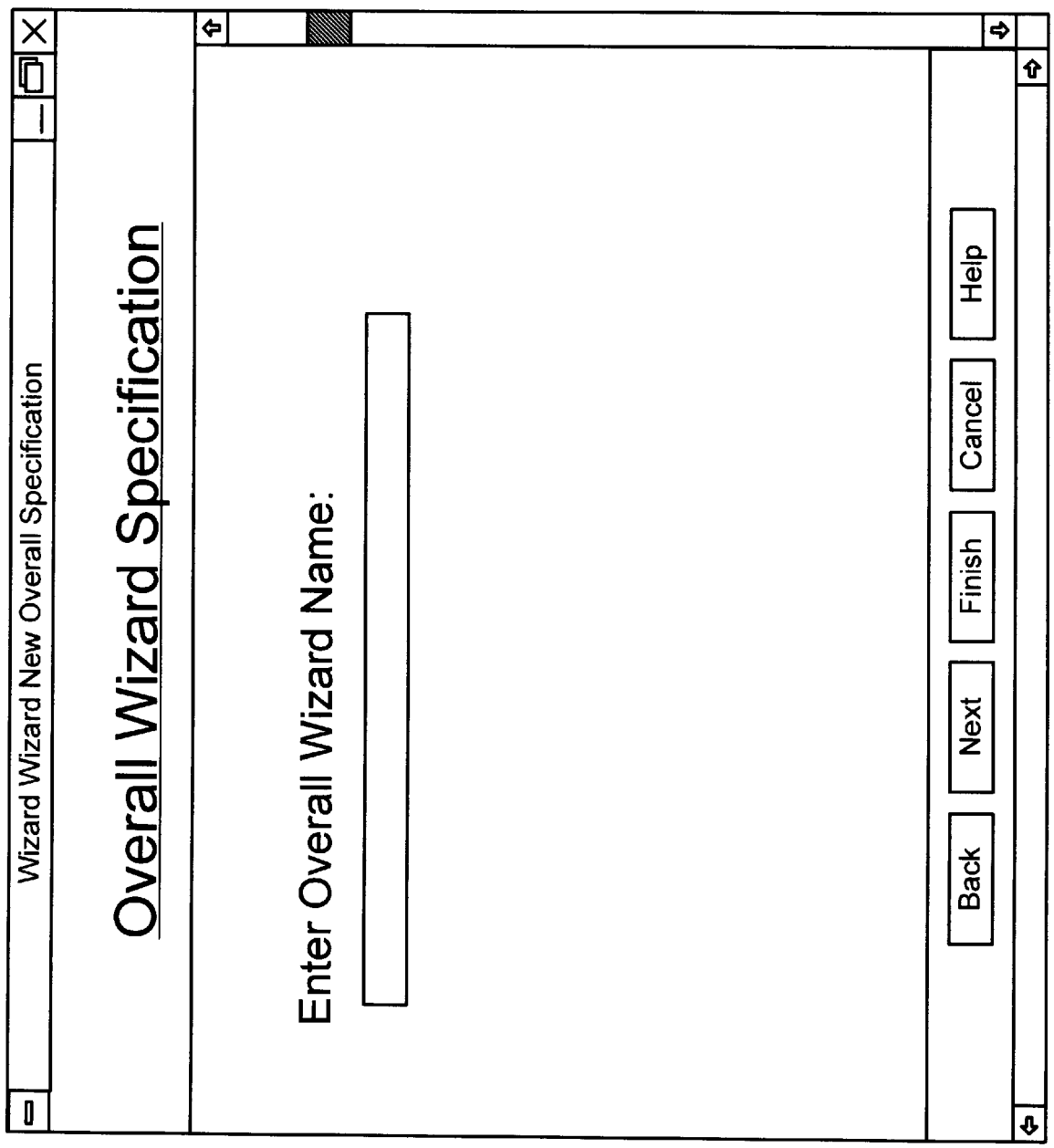

For clarity sake, method 800 will first be described as it is implemented for process development mode, with a description of power mode implementation to follow. The first step 802 of method 800 is to name the new target wizard. This is accomplished by calling the DevelopNewOverallWizard( ) method on WizardWizard. In process mode, the DevelopNewOverallWizard( ) method uses the NewOverallWizardSpecificationPanel to prompt the user to select a name for the target wizard. Turning to FIG. 13 a user interface including an exemplary NewOverallWizardSpecificationPanel is illustrated. Using this panel the user can enter the name that will be used to reference the new target wizard.

The next step, 804, of method 800, is to create a WizardEnvironment object. The next step, 806, is to create a WizardManager object. The next step, 808, is to create a WizardDefault manager object. These three objects form part of the new target wizard skeleton. In the preferred embodiment, these three objects are created automatically by the DevelopNewOverallWizard( ) after the new wizard has been named.

Figure 14:
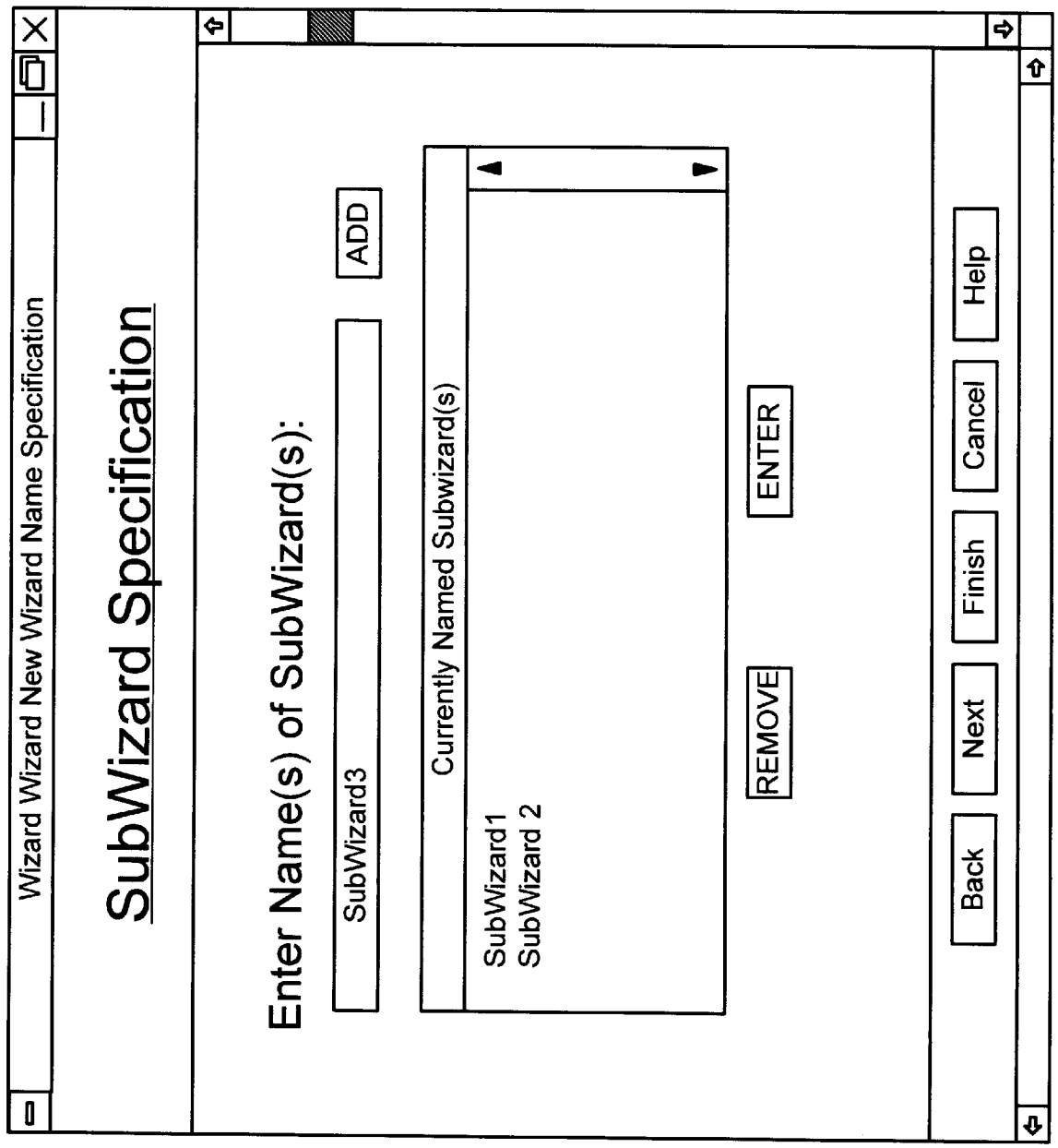

The next step, 810, is to select the number of subwizards and add these subwizards to the target wizard skeleton. In process mode, the developer is prompted to specify the names of subwizards by the NewWizardNamesSpecification panel. Turning to FIG. 14, a user interface including an exemplary NewWizardNamesOverallSpecification panel is illustrated. When the developer specifies the names of the subwizards, the AddNewWizar( )is called on the newly created WizardManager object for each of these subwizards. This performs the next step of, 812, of adding new subwizards to the WizardManager object and creating a new WizardState object, a new WizardStateController object, a new WizardDefault Object and a new WizardCodeGeneration Object for each subwizard. This step is preferably performed automatically by the AddNewWizard( ) method which calls the constructor for each of these objects.

Figure 15:
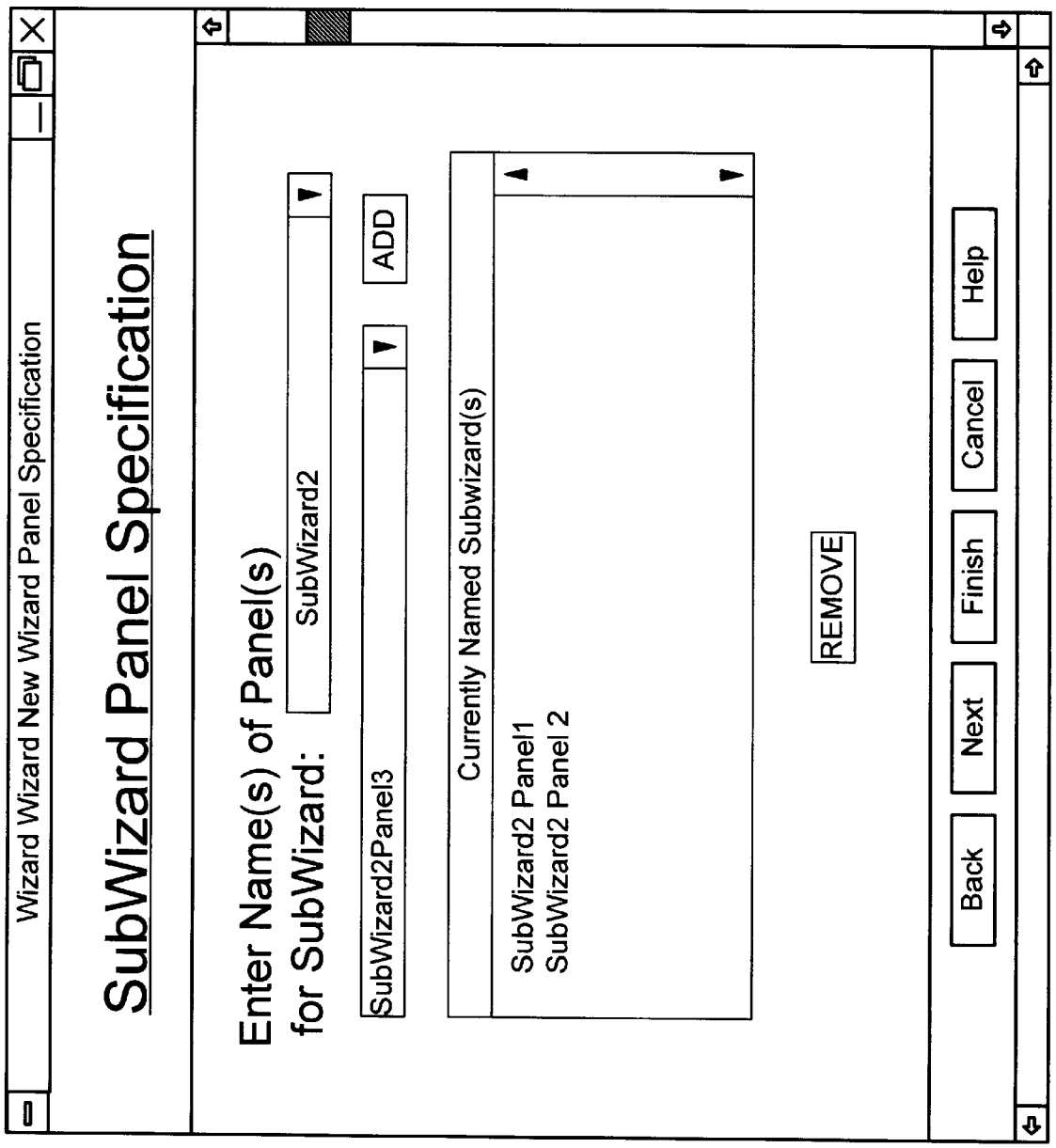

The next step, 814, is to specify for names of panels for each subwizard, and create new WizardPanel object for each panel. In process mode, the developer is prompted to specify the names of the panels for each subwizard by the NewWizardPanelSpecification panel. Turning to FIG. 15, a user interface including an exemplary NewWizardPanelSpecification panel is illustrated. Once the names of the panels for the subwizards are specified, these new panels are automatically created using AddNewWizard( ) method which calls the constructor for each of these objects.

Figure 16:
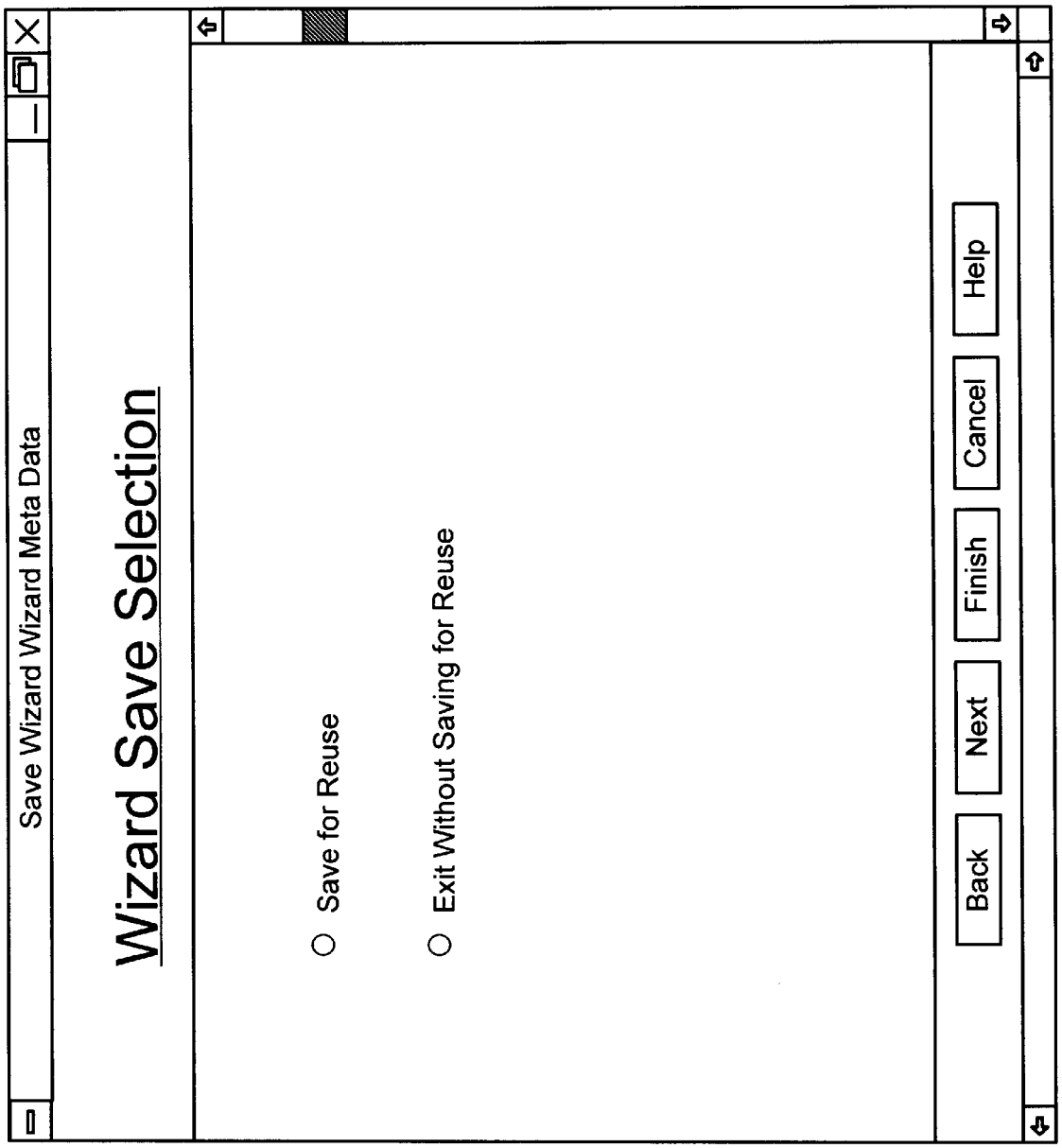

The next step 816 is to save the wizard meta data for reuse and later tuning. Tuning to FIG. 16, an exemplary SaveWizardMetaData panel is illustrated. This allows the developer to select whether or not to save the wizard data before exiting the WizardWizard and going to the Wizard Designer for specialization.

Method 800 can also be performed using a power development mode. In power mode, the developer defines and creates a portion of each subwizard using a visual construction environment which is provided as part of the WizardDesigner. In particular, in power mode the WizardWizard repeatedly invokes the visual constructor, which is behavior provided by the WizardDesigner, on each individual subwizard to complete creation of the panels, the state object contents, the default object contents, the panel object contents, the code generation contents, the panel flow and the state controller. This visual construction environment will be described in more detail with reference to FIG. 28.

Figure 9:
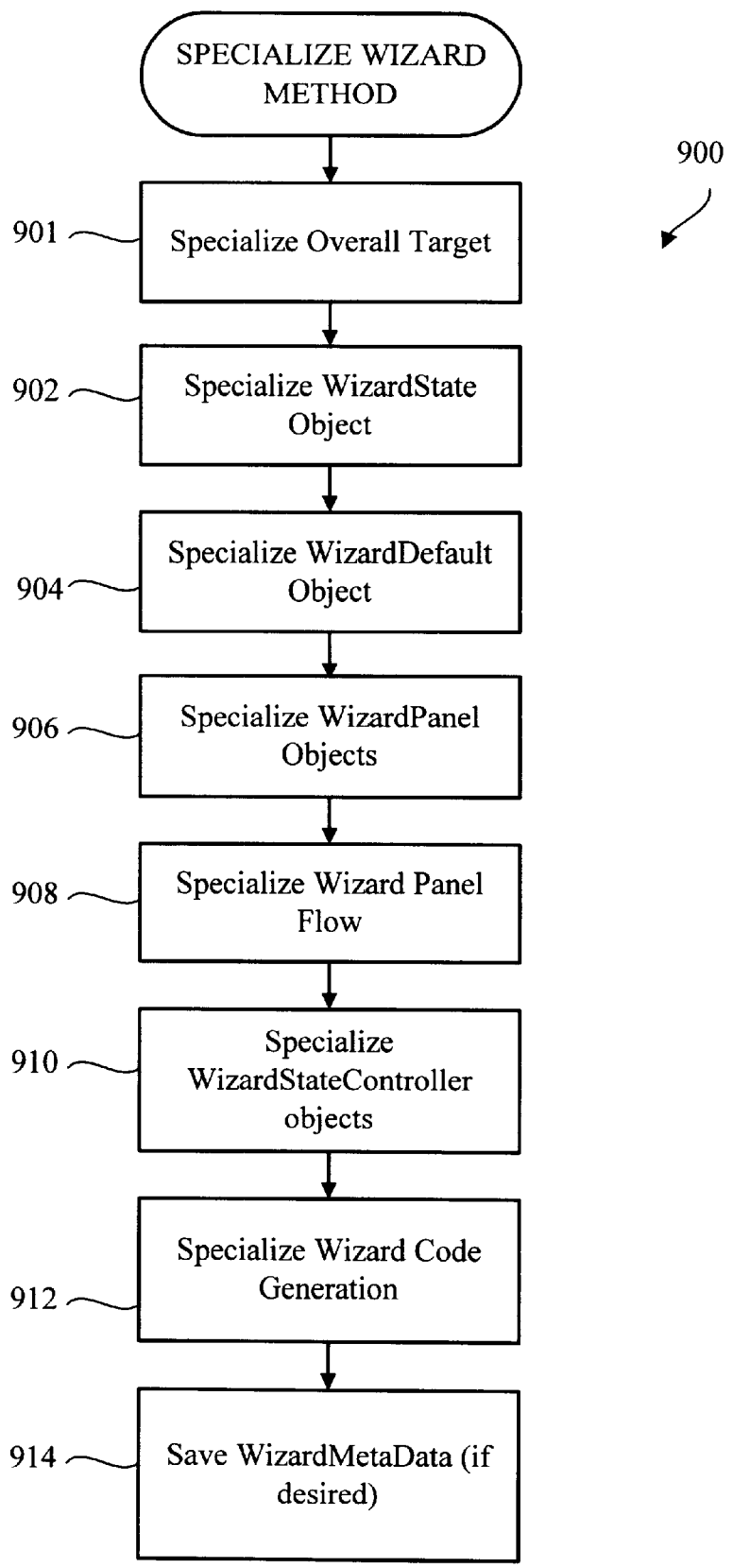
FIG. 9 is a flow diagram illustrating a method for specializing a wizard in accordance with the preferred embodiment.
Figure 17:
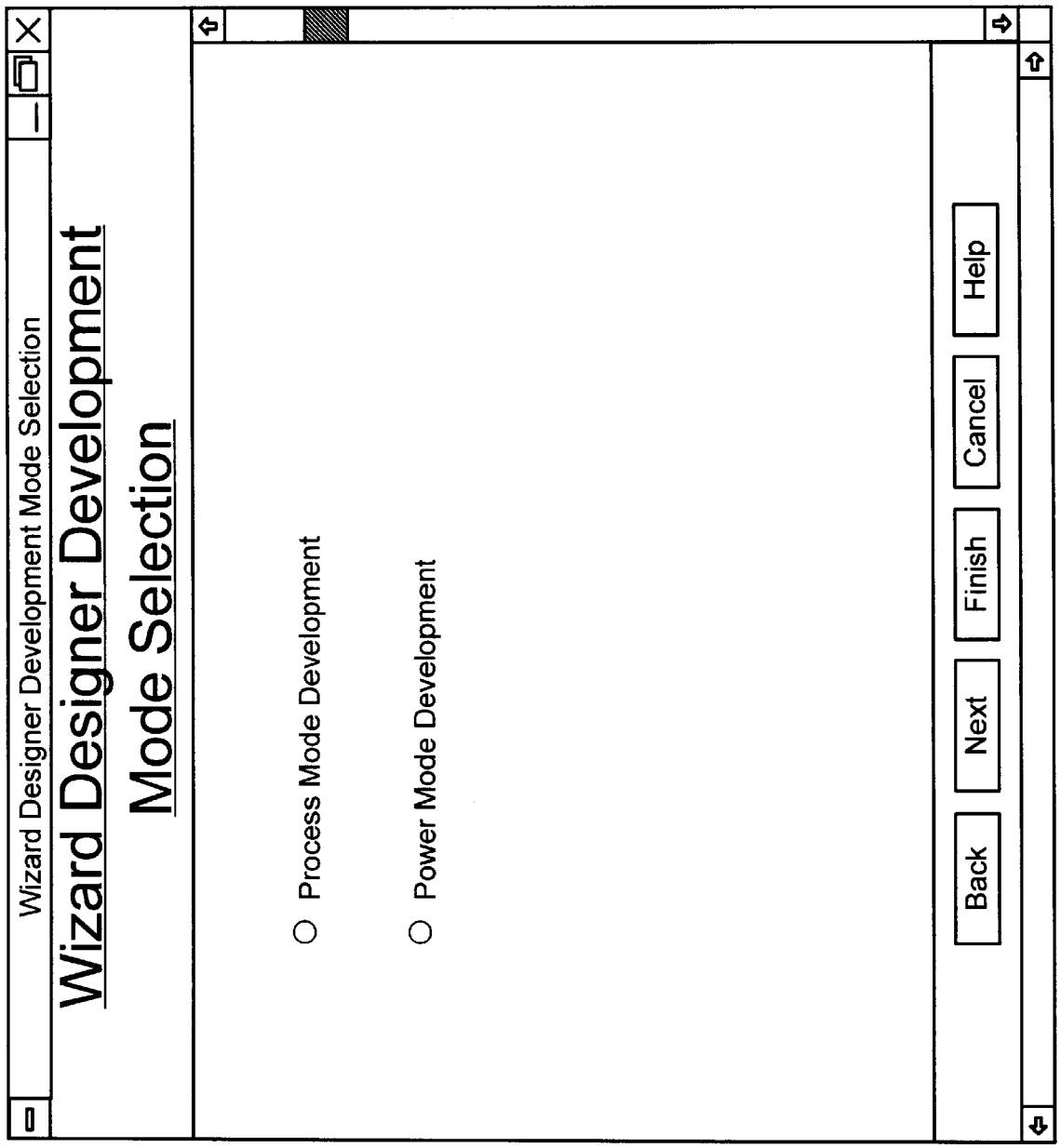

Turning now to FIG. 9, the Specialize Wizard method 900 is illustrated in more detail. Again, in the preferred embodiment wizards can be specialized using a process development mode or a power development mode. In process development mode, the developer is guided through each step in the process. In power development mode, the developer can define the majority of the subwizard components in a single visual construction environment. These two modes those comprise two distinct methods of implementing method 900. Preferably when a wizard is to be specialized, the developer is prompted to select either power or process development mode with the DesignerDevelopmentModeSelection panel, such as that illustrated in FIG. 17. By selecting one of the two options, the developer can choose between process and power development mode operation of the WizardDesigner.

Figure 18:
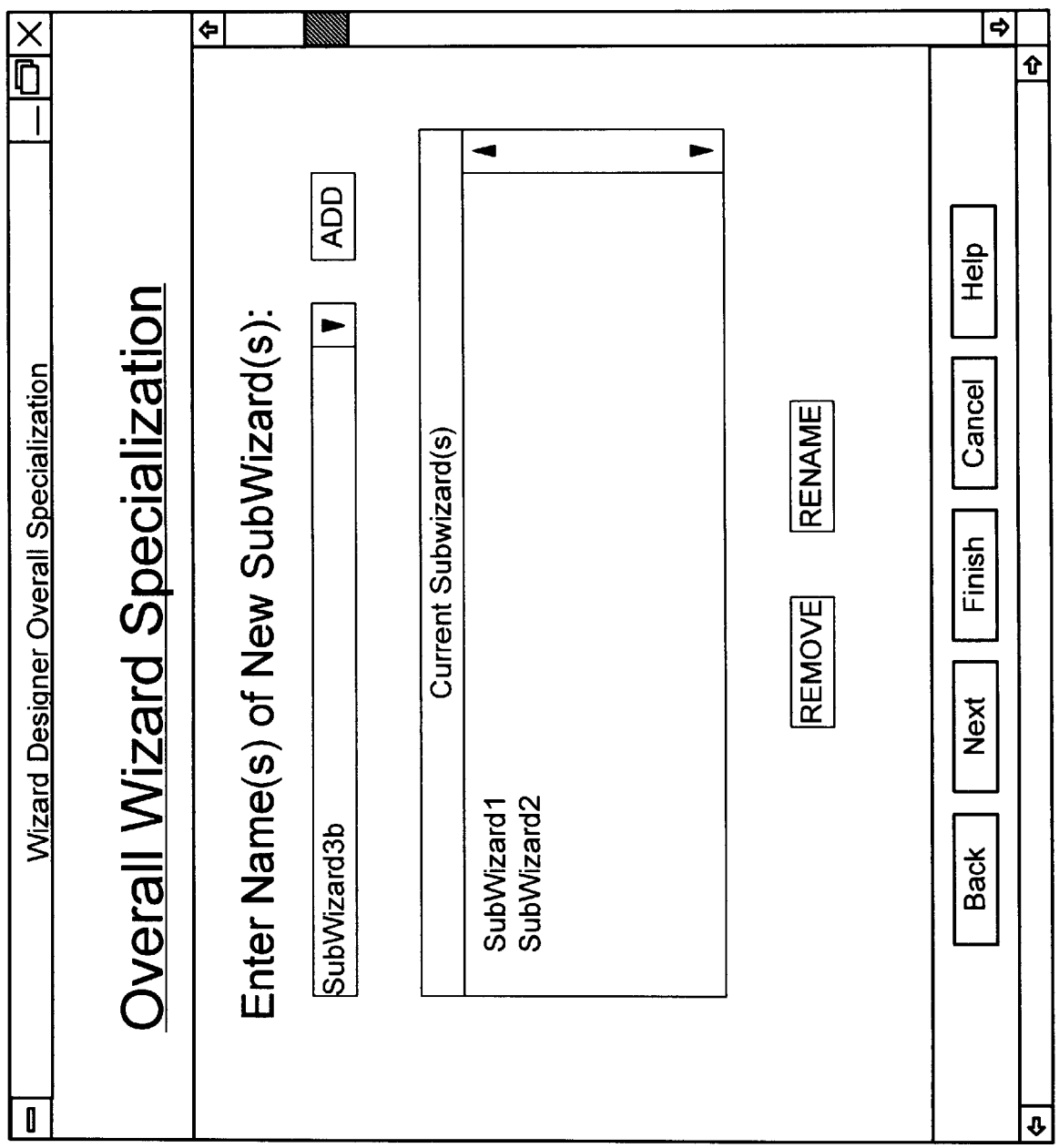

Again for clarity sake, method 900 will first be described as it is implemented for process development mode, with a description of power mode implementation to follow. The first step 901 of method 900 is to perform an overall specialization of the target wizard. This gives the developer the opportunity to add, delete or rename subwizards in the overall target wizard. This operation is typically performed in the WizardWizard, but this gives the developer the opportunity to make further changes to the skeleton of the target wizard. This would typically only be used when a preexisting skeleton is being modified for a new use with the WizardDesigner. In process mode, the OverallWizardSpecialization( ) method first uses the OverallWizardSpecialization panel to allow users to add, remove and/or rename subwizards on the overall target wizard. This allows these additional modifications to be made without having to renter to WizardWizard. Turning now to FIG. 18, a user interface including an exemplary OverallWizardSpecialization panel is illustrated. This panel allows the developer to type in the name of new subwizards, add new subwizards, rename existing subwizards, and deleting unwanted subwizards. The data entered on this panel would then be used to update and add new objects to the target wizard using the appropriate methods such as AddNewWizard( ).

The next step 902 of method 900 is to specialize each WizardState object in the target wizard. This is accomplished by calling the WizardStateObjectSpecialization( ) method on the WizardDesigner. In process mode, the WizardStateObjectSpecialization( ) method uses the StateSpecialization panel to display listings of attribute names, attribute types, a description of the attribute, and an indication as to whether the attribute is required or not. The panel allows the developer to add, remove or rename state attributes to the target wizard. Turning to FIG. 19 an exemplary StateSpecialization panel is illustrated. This panel allows the user to type in the name of a new state attribute, select the attribute type, select whether this state attribute is required, and enter a description of the state attribute. For example, using a drop down list the developer can select from a list of different attribute types, such as integer, floating point, long, string, etc. When these fields have been completed, the developer can press "ADD" to add the new state attribute to the list of current attributes in the target wizard.

Figure 20:
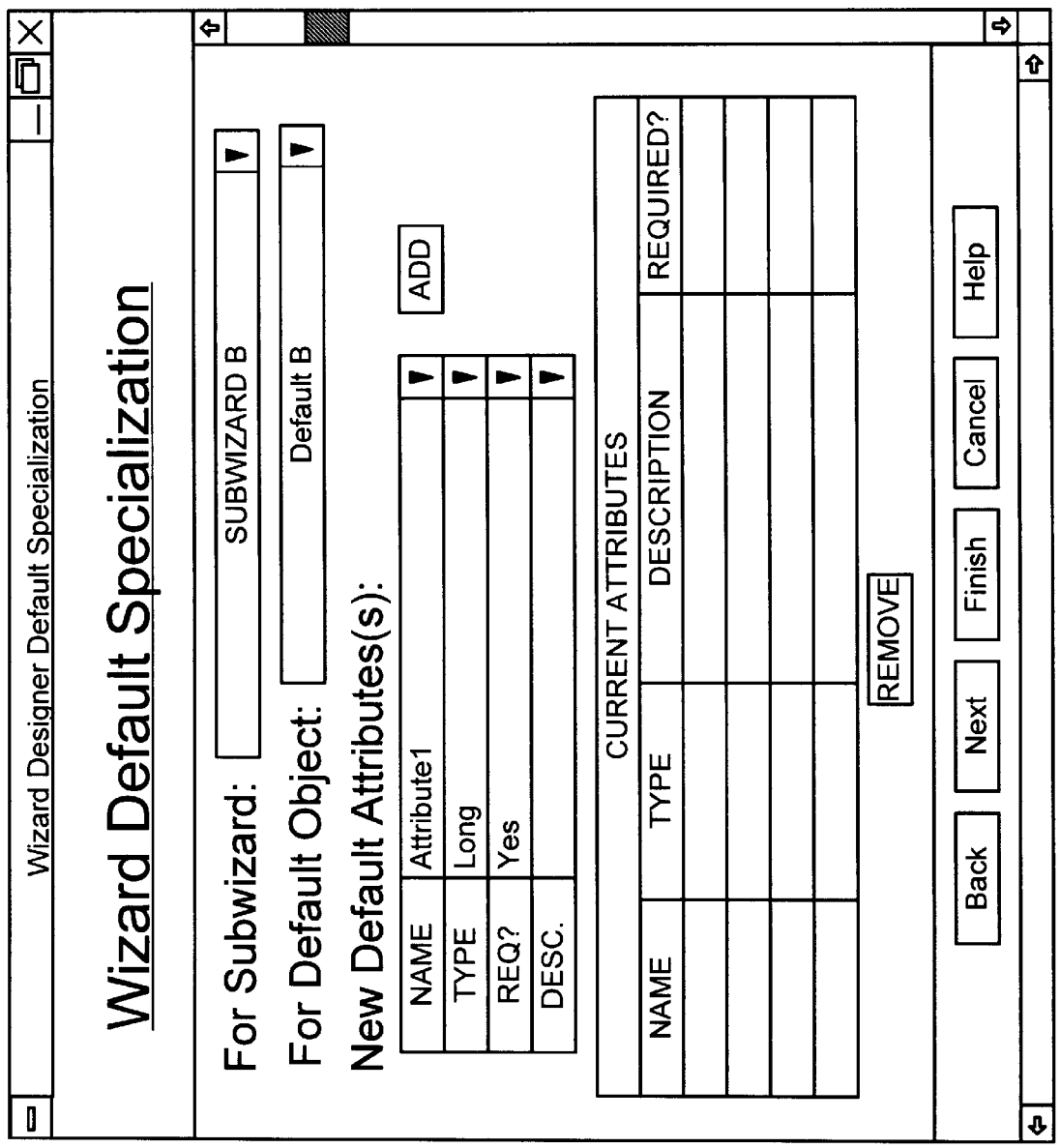

The next step 904 of method 900 is to specialize each WizardDefault object in the target wizard. This is accomplished by calling the DefaultObjectSpecialization( ) method on the WizardDesigner. In process mode, the DefaultObjectSpecialization( ) method uses the DefaultObjectSpecialization panel to display a listing of attribute names, attribute types, a description of the attribute, and an indication as to whether the attribute is required or not. This allows the developer to add, remove or rename default attributes to the target wizard. Turning to FIG. 20 an exemplary DefaultObjectSpecialization panel is illustrated. Like the StateObjectSpecialization panel, this panel allows the developer to type in the name of a new default attribute, select the attribute type, select whether this default attribute is required, and enter a description of the default attribute. The user can then add the new default attribute to the target wizard. The panel also allows the developer to remove existing default attributes as needed.

Figure 21:
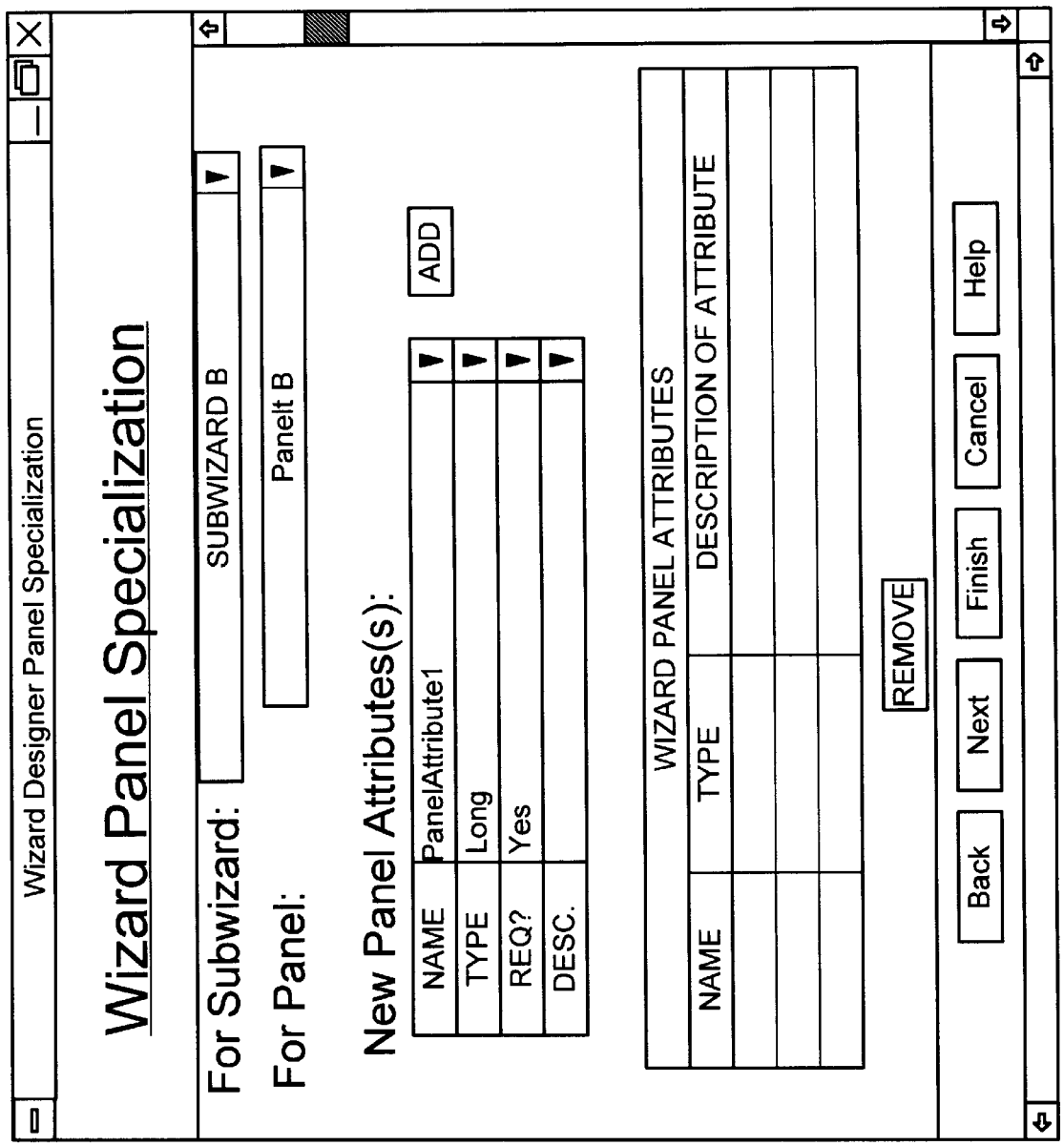

The next step 906 of method 900 is to specialize each WizardPanel object in the target wizard. This is accomplished by calling the PanelSpecialization( ) method on the WizardDesigner. In process mode, the PanelSpecialization( ) method uses the PanelSpecialization panel to display listings of wizard panel attributes, their type, and a description of the corresponding attribute. This allows the developer to add new panel attributes and remove existing panel attributes. Turning to FIG. 21 an exemplary PanelSpecialization panel is illustrated this panel allows the developer to type in the name of a new panel attribute, select the panel attribute type, select whether this panel attribute is required, and enter a description of the panel attribute. The user can then activate the "ADD" button to add this new panel attribute to the target wizard. The panel also allows the developer to remove existing default attributes as needed.

Figure 22:
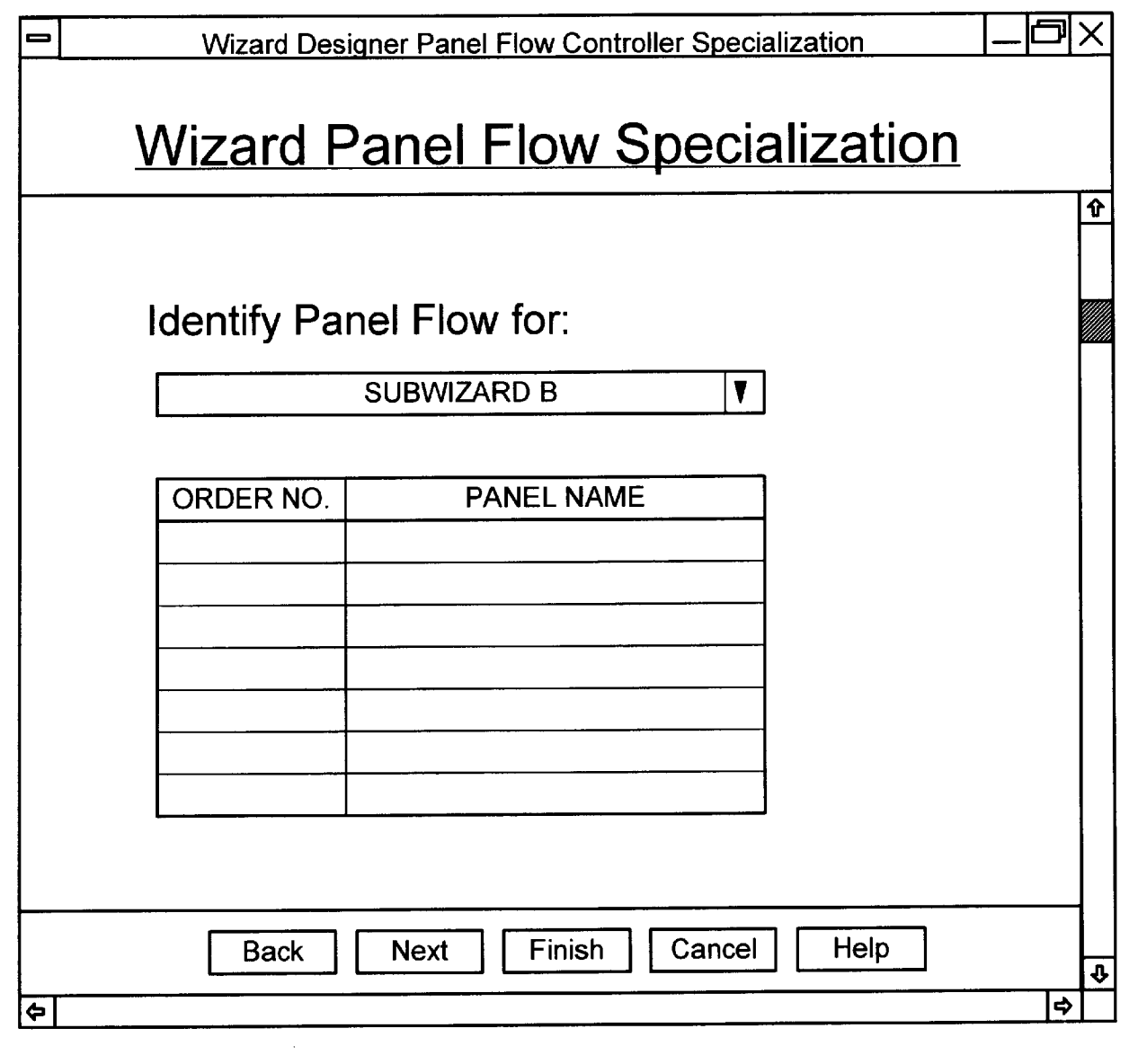

The next step 908 of method 900 is to specialize each the Wizard Panel flow for all panels in the target wizard. This is accomplished by calling the PanelFlowSpecialization( ) method on the WizardDesigner. In process mode, the PanelFlowSpecialization( ) method uses the PanelFlowSpecialization panel to display ordered listings of the panels defined for the subwizards of the target. Turning to FIG. 22 an exemplary PanelFlowSpecialization panel is illustrated. The panel facilitates allows the change the order of panels in each subwizard. In particular, the panel allows the user to select a subwizard from a drop down list, causing a list of all the panels for the subwizard to be displayed. The developer can then order the panels in this list by typing in new order numbers, or by dragging and dropping the panels to the desired order. This panel also allows specification of conditional numbering of the panels for each subwizard. For example, based on whether or not any of the contained panel attributes are required or not, certain subwizard panels may not be automatically skipped. In addition, a panel, state or control attribute can be defined, which is set with a specific user's default operation preference, which is then used to streamline the wizard panel flow.

Figure 23:
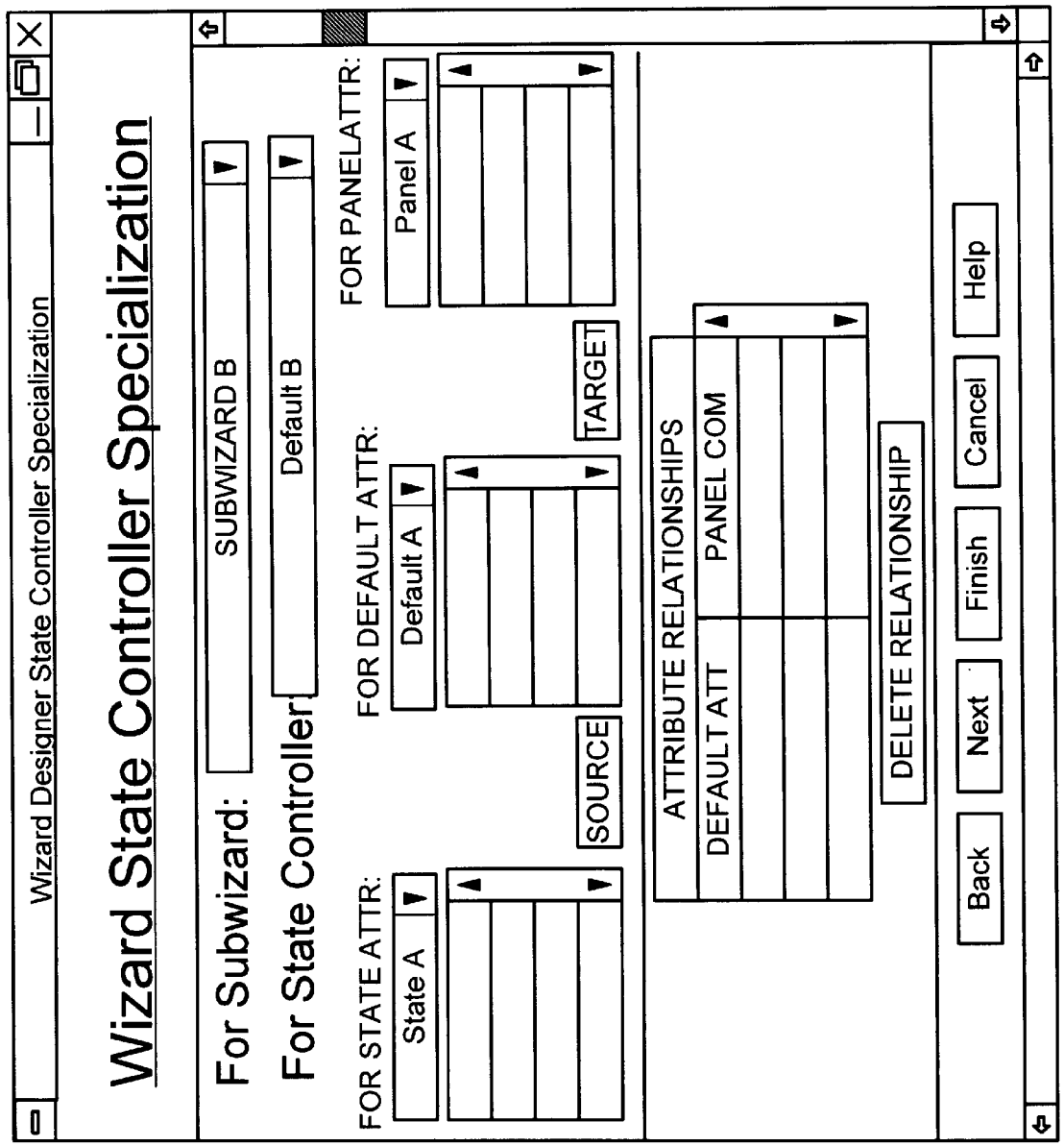

The next step 910 of method 900 is to specialize each WizardStateController object in the target wizard. Wizard- StateController objects encapsulate the relationships between state, default, panel and code generator. Defining and storing these relationships in a WizardStateController object is accomplished by calling the StateControllerSpecialization( ) method on the WizardDesigner. Turning to FIG. 23 an exemplary StateControllerSpecialization panel is illustrated. In process mode, the StateControllerSpecialization panel to display listings of the WizardState attributes, WizardDefault attributes, and Panel components defined by the previous methods. The panel allows the developer to define relationships between attributes by highlighting a first attribute and activating the "source" button, highlighting a second attribute and activating the "target" button. The two selected attributes will then appear in the list of attribute relationships. Relationships can be deleted by selecting the related pair and then pressing "delete relationship". This method further checks to assure that the relationships are valid by checking them against constraints such as valid type combinations defined by the StateControllerMethod( ). When this panel is exited, the relationship between related pairs is stored in a WizardStateController object.

Figure 24:
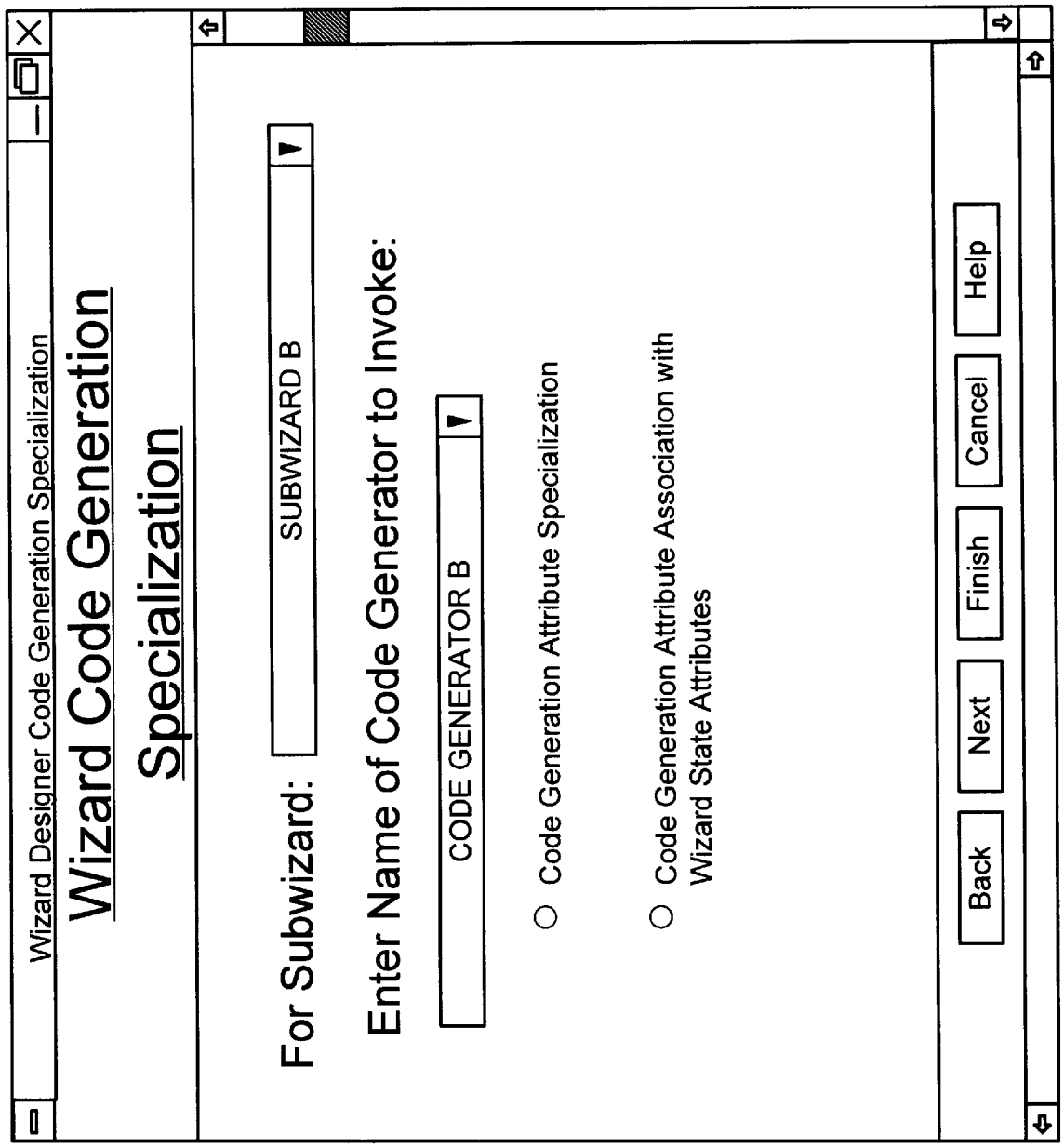

The next step 912 of method 900 is to specialize each WizardCodeGenerator object in the target wizard. This involves the creation of code generation attributes on the code generation object, and associated those attributes with WizardState attributes. This is accomplished by calling the CodeGenerationSpecalization( ) method on the WizardDesigner. In process mode, the CodeGenerationSpecalization( ) method uses three panels to guide the developer through this process, a WizardCodeGeneration panel for selecting what specialization steps to perform, a CodeGenerationAttributeSpecialization panel for adding new attributes to the CodeGeneration object, and a CodeGenerationAttributeAssoication panel for associating those attributes with StateObject attributes. Turning to FIG. 24 an exemplary WizardCodeGeneration panel is illustrated. This first panel allows the developer to specify the name of a code generator and select whether to enter the Code Generation Attribute Specialization, where new attributes are defined on the code generation object, or go directly to the Code Generation Attribute Association, where the code generation object attributes are associated with related state object's attributes. Typically, a developer will need to perform both steps, unless all the code generation attributes were previously created.

Figure 25:
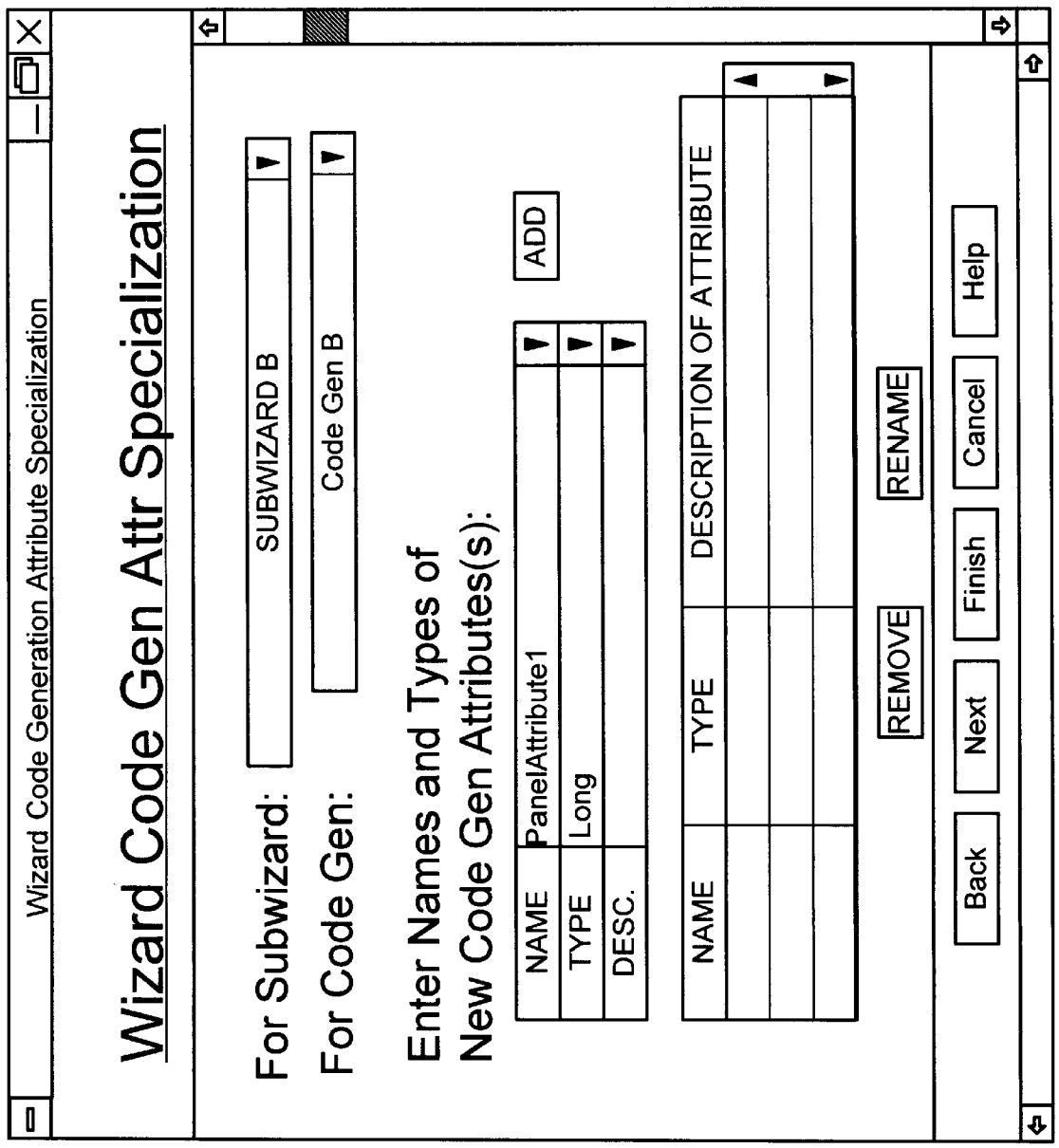

Turning to FIG. 25, an exemplary CodeGenerationAttributeSpecialization panel is illustrated. This panel displays listings of CodeGeneration attributes, their type, and a description of the corresponding attribute. This allows the developer to add new CodeGeneration attributes, select their type and enter a description of the CodeGeneration. The user can then activate the "ADD" button to add this new panel attribute to the target wizard. The panel also allows the developer to remove and rename existing CodeGeneration attributes as needed.

Figure 26:
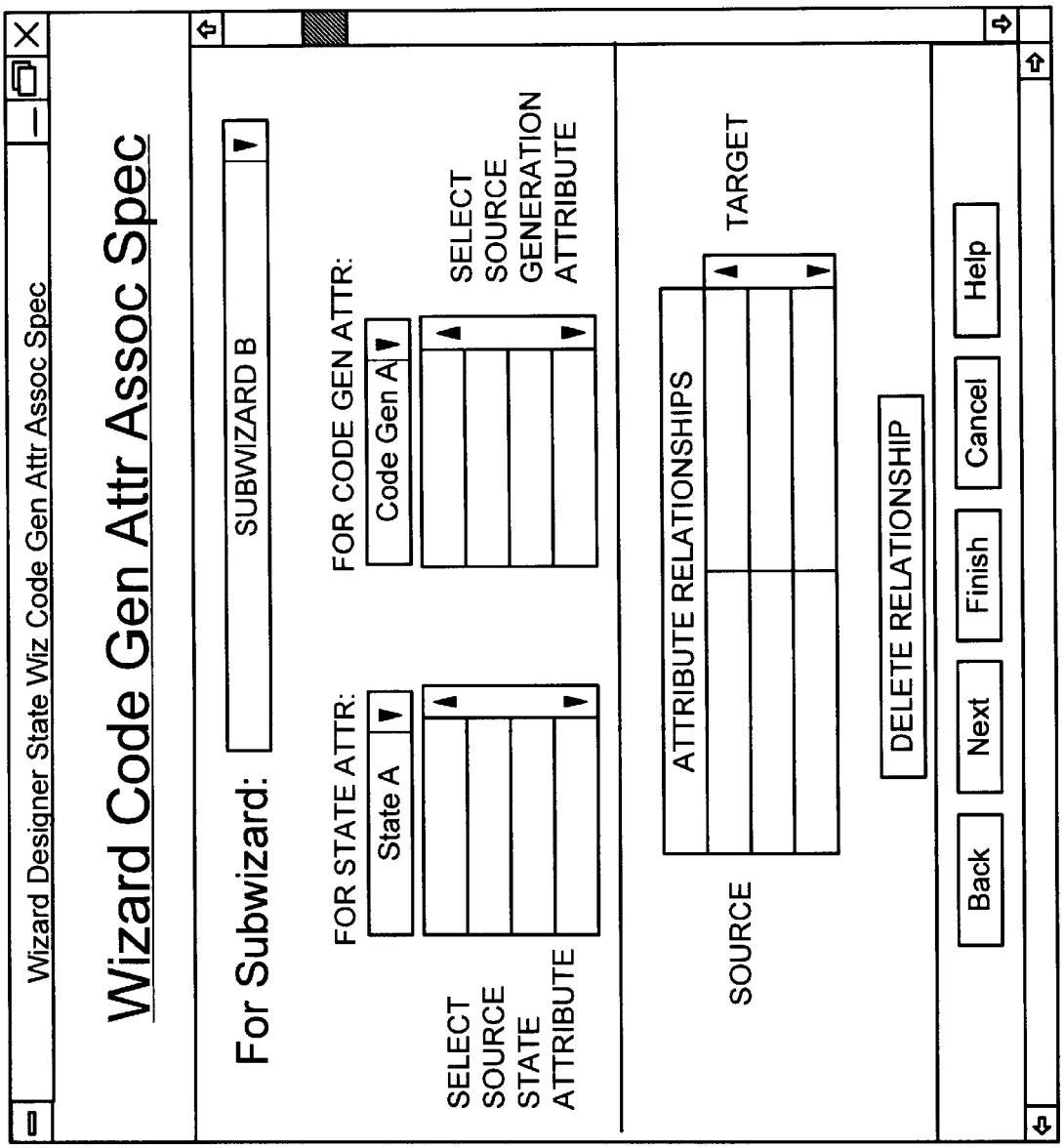

Turning to FIG. 26, an exemplary CodeGenerationAttributeAssoication panel for associating those CodeGeneration attributes with StateObject attributes is illustrated. This panel displays listings of the WizardState attributes and CodeGeneration attributes defined with the previous panel. The panel allows the developer to define relationships between attributes by selecting a "source" attribute from the list of state attributes and selecting a "target" attribute from the list of CodeGeneration attributes. The two selected attributes will then appear in the list of attribute relationships. Relationships can be deleted by selecting the related pair and then pressing "delete relationship".

Figure 27:
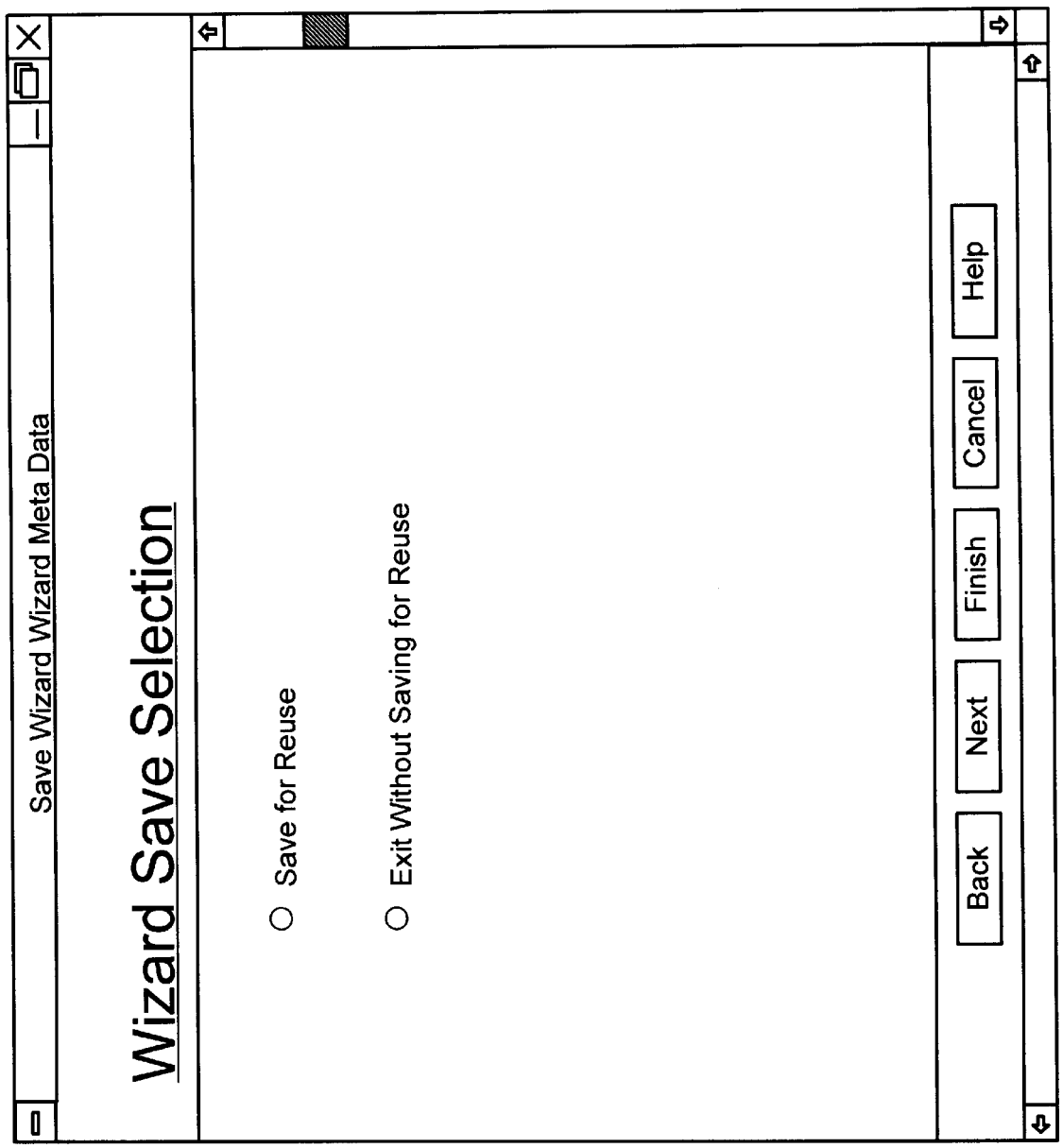

With the code generation specialization performed, the next step 914 is to save the WizardMetaData, if desired. Tuning to FIG. 27, an exemplary DesignerSaveWizardMetaData panel is illustrated. This allows the developer to select whether or not to save the wizard data before exiting the WizardDesigner.

Thus, the preferred embodiment WizardDesigner 126 allows a developer to specialize an existing target wizard skeleton for a particular use in an relatively easy and efficient way.

Figure 28:
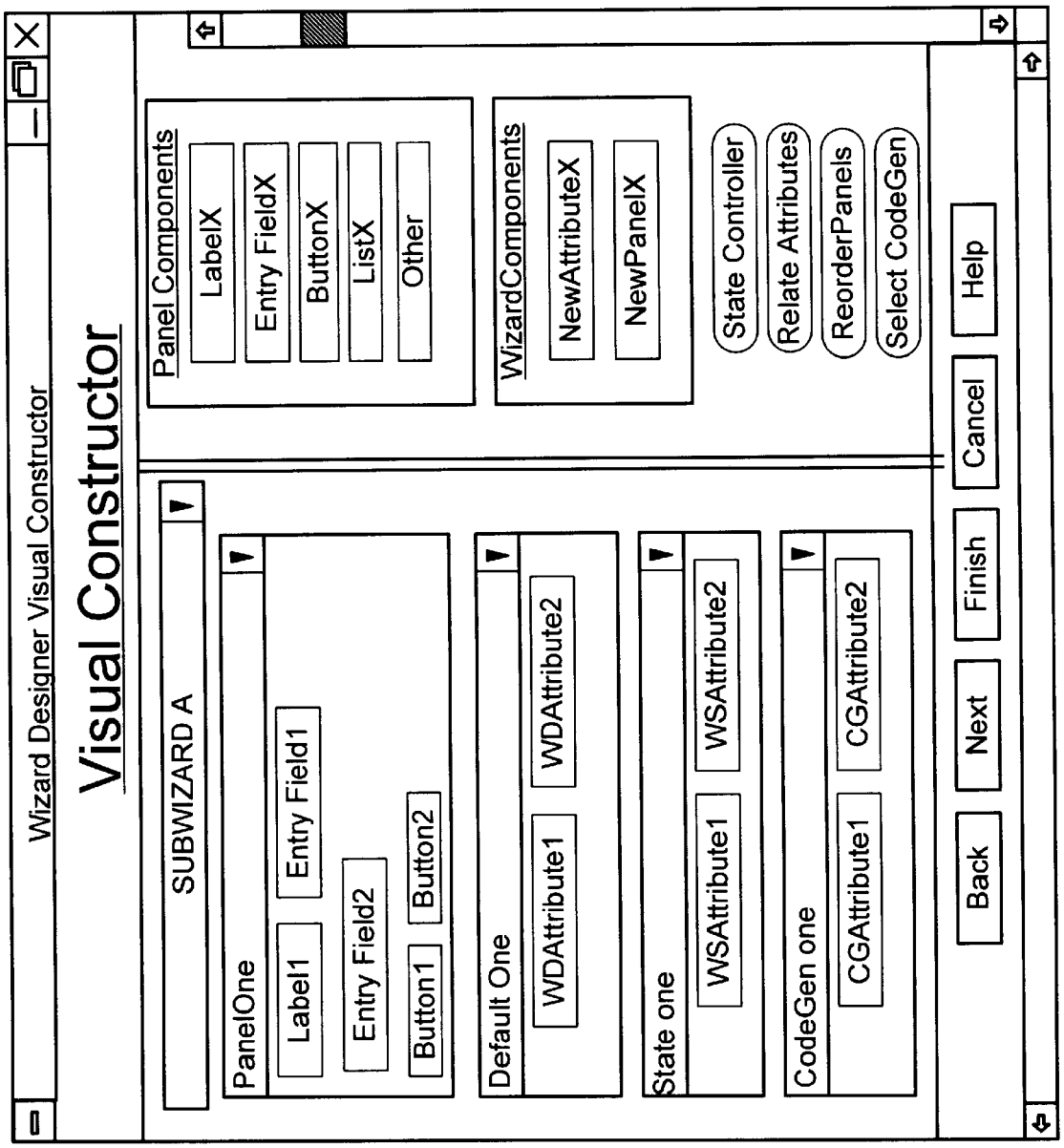
FIG. 28 is a block diagrams illustrating an exemplary visual construction environment in accordance with the preferred embodiment.

Methods 800 and 900 can also be performed using a power development mode. In power mode, the developer specializes the target wizard skeleton using a visual construction environment. Turning to FIG. 28, an exemplary WizardDesigner visual construction environment is illustrated that allows the developer to perform methods 800 and 900 without explicitly guiding him through all the steps. The visual construction environment is created when the developer selects power development mode, calling the VisualConstructor( ) method. This method creates a visual construction environment defined by the VisualConstructorFrame object and a series of reusable palettes. These include a Panel Components pallette and a Wizard Components pallette. A core set of Wizard Framework components are illustrated and modifiable within the visual construction environment. These preferably include a Wizard Panel, a WizardState object, a WizardDefault object, a CodeGeneration object and their related attributes. The developer can perform the skeleton creation steps of method 800 using this panel for example. By activating a "new subwizard" option from the drop down list of subwizards a new subwizard can be added. Likewise, by activating a "new panel" option from the drop down list of panels a new panel can be added to the current subwizard. The developer can also perform the specialization steps of method 900 by dragging and dropping attributes between components on the visual constructor environment. For example, by dragging attributes from GUI elements from "panel components" to a panel selected (from the drop-down list) the developer can add new GUI elements to that panel. Likewise, by dragging components "wizard components" new attributes can be added to the state and default objects. These attributes can then be further defined by clicking on the attribute to activate a modifiable list of its properties (i.e., name, type, description) Furthermore, by selecting pairs of attributes (i.e., state, default, and panel attributes) relationships can be defined and stored in a wizard controller object.

Thus, the preferred embodiment of the present invention provides an object oriented wizard creation mechanism provides an environment and set of facilities for creating and modifying wizards. The preferred embodiment wizard creation mechanism provides a WizardWizard mechanism for creating the skeleton of new wizard, a WizardDesigner mechanism for specializing and WizardMetaDataManager mechanism for persisting and retrieving created wizards. The WizardWizard guides the developer through a predetermined series of steps that are required to define a the basic components of a new wizard. The WizardDesigner takes these basic components and guides the developer through a specialization process that further customizes and defines the new wizard. In the preferred embodiment, the WizardWizard and the WizardDesigner create and specialize the target wizard from a component based Wizard framework. The use of the component based Wizard framework with the WizardWizard and WizardDesigner provide a customizable and extensible wizard creation solution to that has utmost functionality and flexibility to the users and developers.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. For example, while the preferred embodiment has been described with reference to an object-oriented framework solution, it could also be implemented with another component based programming environment. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor; and
   a computer program residing in the memory and being executed by the at least one processor, the computer program including a wizard mechanism for guiding a developer through a target wizard creation process, the wizard mechanism comprising
   a wizard creator mechanism, the wizard creator mechanism responsive to the developer to build a target wizard by instantiating a new overall target wizard skeleton and adding one or more subwizards to the new overall target wizard, the new overall target wizard skeleton and the subwizards instantiated from a wizard framework, the wizard framework defining a plurality of classes used to create target wizards, wherein the created target wizard skeleton includes:
   i) a plurality of panel objects for guiding a user of the target wizard, the plurality of panel objects including at least one panel attribute;
   ii) at least one wizard object for each subwizard in the target wizard skeleton, the at least one wizard object for referencing other objects in the subwizard;
   iii) a wizard state object for referencing at least one wizard state attribute;
   iv) a wizard default object for referencing at least one wizard default attribute; and
   v) a wizard state controller object for defining and storing relationships between the at least one wizard state attribute; the at least one wizard default attribute, and the at least one wizard panel attribute.

2. The apparatus of claim 1 wherein the wizard creator mechanism includes methods for creating a new overall target wizard and adding one or more subwizards to the new overall target wizard.

3. The apparatus of claim 1 wherein the wizard mechanism includes a plurality of panel mechanisms for providing a user interface to guide the developer through the process of creating the target wizard skeleton.

4. The apparatus of claim 3 wherein the plurality of panel mechanisms include a reuse selection panel for selecting whether to create a new target wizard skeleton or modifying an existing wizard skeleton.

5. The apparatus of claim 3 wherein the plurality of panel mechanisms include a development mode selection panel for selecting whether the developer is guided through each step of creating a target wizard or taken to a visual constructor where the developer can manually create the new target wizard skeleton.

6. The apparatus of claim 3 wherein the plurality of panel mechanisms include a new wizard names panel for adding and naming one or more subwizards to the overall target wizard skeleton.

7. The apparatus of claim 3 wherein the plurality of panel mechanisms include a new wizard panels panel for adding one or more panels to the target wizard skeleton.

8. The apparatus of claim 3 wherein the plurality of panel mechanisms include a save wizard meta data panel for allowing the developer to save meta data for the target wizard skeleton.

9. The apparatus of claim 1 wherein the created target wizard skeleton includes at least one wizard object for each subwizard in the target wizard skeleton.

10. The apparatus of claim 1 wherein the created target wizard skeleton includes a wizard object for each subwizard in the target wizard skeleton, the wizard object including references to other objects making up the corresponding subwizard.

11. The apparatus of claim 1 wherein the created target wizard skeleton includes a wizard state object for referencing at least one wizard state attribute, a wizard default object for referencing at least one wizard default attribute.

12. The apparatus of claim 11 wherein the created target wizard skeleton includes a wizard state controller object for defining and storing relationships between the at least one wizard state attribute, the at least one wizard default attribute and the wizard panel attribute.

13. The apparatus of claim 12 wherein the created target wizard skeleton includes wizard code generator object for generating code from data stored in the at least one wizard state attribute.

14. The apparatus of claim 1 wherein the created target wizard skeleton includes a wizard manager object for controlling execution of one or more subwizards in the target wizard skeleton.

15. The apparatus of claim 1 wherein the created target wizard skeleton includes a default wizard manager object for controlling interactions between wizard default objects in subwizards of the target wizard skeleton.

16. An apparatus comprising:
   at least one processor;
   a memory coupled to the at least one processor;
   a wizard mechanism for guiding a developer through the process of creating a target
   wizard skeleton from a wizard framework, the wizard mechanism comprising:
   a) a wizard creator mechanism, wherein the wizard creator mechanism includes methods for creating a new overall target wizard and adding one or more subwizards to the new overall target wizard; and
   b) a plurality of panel mechanisms for providing a user interface to guide the developer through the process of creating the target wizard skeleton, the plurality of panel mechanism guiding the developer through the process of creating the target wizard skeleton, wherein the created target wizard skeleton includes:
   i) a plurality of panel objects for guiding a user of the target wizard, the plurality of panel objects including at least one panel attribute;
   ii) at least one wizard object for each subwizard in the target wizard skeleton, the at least one wizard object for referencing other objects in the subwizard;
   iii) a wizard state object for referencing at least one wizard state attribute;
   iv) a wizard default object for referencing at least one wizard default attribute; and v) a wizard state controller object for defining and storing relationships between the at least one wizard state attribute; the at least one wizard default attribute, and the at least one wizard panel attribute.

17. The apparatus of claim 16 wherein the plurality of panel mechanisms include a reuse selection panel for selecting whether to create a new target wizard skeleton or modify an existing target wizard skeleton, wherein the wizard mechanism calls a meta data manager to retrieve existing wizard meta data is the developer selects to modify an existing target wizard skeleton, and wherein the plurality of panel mechanism further includes a save wizard meta data panel for allowing the developer to save meta data for the target wizard skeleton.

18. The apparatus of claim 16 wherein the plurality of panel mechanisms include a development mode selection panel for selecting whether the developer is guided through multiple steps in creating a target wizard skeleton by the plurality of panel mechanisms or taken to a visual constructor where the developer can manually create the new target wizard skeleton.

19. The apparatus of claim 16 wherein the plurality of panel mechanisms include a new wizard names panel for adding and naming one or more subwizards to the overall target wizard skeleton, and a new wizards panels panel for adding one or more panels for each of the one or more subwizards in the target wizard skeleton.

20. The apparatus of claim 16 wherein the target wizard skeleton further includes a code generator object for generating code from data stored in the at least one wizard state attribute.

21. The apparatus of claim 16 wherein the target wizard skeleton further includes
   a wizard manager object for controlling execution of one or more subwizards in the target wizard skeleton;
   a default wizard manager object for controlling interactions between wizard default objects in subwizards of the target wizard skeleton;
   a wizard manager button panel object for providing navigation buttons in the target wizard user interface; and
   a wizard manager frame object for providing a the user interface structure to encapsulate the plurality of wizard panels.

22. A program product comprising:
(A) a wizard mechanism for guiding a developer through the process of creating a target wizard, the wizard mechanism building a target wizard by instantiating a target wizard skeleton from a wizard framework, the wizard mechanism comprising:
   1) a wizard creator mechanism, the wizard creator mechanism further comprising methods for creating a new overall target wizard and adding one or more subwizards to the new overall target wizard; and
   2) a plurality of panel mechanisms for providing a user interface to guide the developer through the process of creating the target wizard skeleton, the plurality of panel mechanism guiding the developer through the process of creating the target wizard skeleton;
   wherein the created target wizard skeleton includes:
      i) a plurality of panel objects for guiding a user of the target wizard, the plurality of panel objects including at least one panel attribute;
      ii) at least one wizard object for each subwizard in the target wizard skeleton, the at least one wizard object for referencing other objects in the subwizard;
      iii) a wizard state object for referencing at least one wizard state attribute;
      iv) a wizard default object for referencing at least one wizard default attribute; and
      v) a wizard state controller object for defining and storing relationships between the at least one wizard state attribute; the at least one wizard default attribute, and the at least one wizard panel attribute; and
(B) signal bearing media bearing the wizard mechanism.

23. The program product of claim 22 wherein the signal bearing media comprises recordable media.

24. The program product of claim 22 wherein the signal bearing media comprises transmission media.

25. The program product of claim 22 wherein the wizard mechanism includes a wizard creator mechanism, wherein the wizard creator mechanism includes methods for creating a new overall target wizard and adding one or more subwizards to the new overall target wizard.

26. The program product of claim 22 wherein the wizard mechanism includes a plurality of panel mechanisms for providing a user interface to guide the developer through the process of creating the target wizard skeleton.

27. The program product of claim 26 wherein the plurality of panel mechanisms include a reuse selection panel for selecting whether to create a new target wizard skeleton or modifying an existing wizard skeleton.

28. The program product of claim 26 wherein the plurality of panel mechanisms include a development mode selection panel for selecting whether the developer is guided through each step of creating a target wizard or taken to a visual constructor where the developer can manually create the new target wizard skeleton.

29. The program product of claim 26 wherein the plurality of panel mechanisms include a new wizard names panel for adding and naming one or more subwizards to the overall target wizard skeleton.

30. The program product of claim 26 wherein the plurality of panel mechanisms include a new wizard panels panel for adding one or more panels to the target wizard skeleton.

31. The program product of claim 26 wherein the plurality of panel mechanisms include a save wizard meta data panel for allowing the developer to save meta data for the target wizard skeleton.

32. The program product of claim 22 wherein the created target wizard skeleton includes at least one wizard object for each subwizard in the target wizard skeleton.

33. The program product of claim 22 wherein the created target wizard skeleton includes a wizard object for each subwizard in the target wizard skeleton, the wizard object including references to other objects making up the subwizard.

34. The apparatus of claim 22 wherein the created target wizard skeleton includes wizard code generator object for generating code from data stored in the at least one wizard state attribute.

35. The program product of claim 22 wherein the created target wizard skeleton includes a wizard manager object for controlling execution of one or more subwizards in the target wizard skeleton and wherein the created target wizard skeleton includes a default wizard manager object for controlling interactions between wizard default objects in subwizards of the target wizard skeleton.

36. A program product comprising:
(A) a wizard mechanism for guiding a developer through the process of creating a target wizard skeleton from a wizard framework, the wizard mechanism comprising:

a) a wizard creator mechanism, wherein the wizard creator mechanism includes methods for creating a new overall target wizard and adding one or more subwizards to the new overall target wizard; and b) a plurality of panel mechanisms for providing a user interface to guide the developer through the process of creating the target wizard skeleton, the plurality of panel mechanism guiding the developer through the process of creating the target wizard skeleton, wherein the created target wizard skeleton includes:

i) a plurality of panel objects for guiding a user of the target wizard, the plurality of panel objects including at least one panel attribute;

ii) at least one wizard object for each subwizard in the target wizard skeleton, the at least one wizard object for referencing other objects in the subwizard;

iii) a wizard state object for referencing at least one wizard state attribute;

iv) a wizard default object for referencing at least one wizard default attribute; and v) a wizard state controller object for defining and storing relationships between the at least one wizard state attribute; the at least one wizard default attribute, and the at least one wizard panel attribute; and (B) signal bearing media bearing the wizard mechanism.

37. The program product of claim 36 wherein the signal bearing media comprises recordable media.

38. The program product of claim 36 wherein the signal bearing media comprises transmission media.

39. The program product of claim 36 wherein the plurality of panel mechanisms include a reuse selection panel for selecting whether to create a new target wizard skeleton or modify an existing target wizard skeleton, wherein the wizard mechanism calls a meta data manager to retrieve existing wizard meta data is the developer selects to modify an existing target wizard skeleton, and wherein the plurality of panel mechanism further includes a save wizard meta data panel for allowing the developer to save meta data for the target wizard skeleton.

40. The program product of claim 36 wherein the plurality of panel mechanisms include a development mode selection panel for selecting whether the developer is guided through multiple steps in creating a target wizard skeleton by the plurality of panel mechanisms or taken to a visual constructor where the developer can manually create the new target wizard skeleton.

41. The program product of claim 36 wherein the plurality of panel mechanisms include a new wizard names panel for adding and naming one or more subwizards to the overall target wizard skeleton, and a new wizards panels panel for adding one or more panels for each of the one or more subwizards in the target wizard skeleton.

42. The program product of claim 36 wherein the target wizard skeleton further includes a code generator object for generating code from data stored in the at least one wizard state attribute.

43. The program product of claim 36 wherein the target wizard skeleton further includes:

a wizard manager object for controlling execution of one or more subwizards in the target wizard skeleton;

a default wizard manager object for controlling interactions between wizard default objects in subwizards of the target wizard skeleton;

a wizard manager button panel object for providing navigation buttons in the target wizard user interface; and a wizard manager frame object for providing a the user interface structure to encapsulate the plurality of wizard panels.

44. A method for facilitating the creation of a target wizard, the method comprising the steps of:

a) providing a wizard mechanism for guiding a developer through the process of creating a target wizard from a wizard framework;

b) providing the wizard framework, the wizard framework defining a plurality of classes used to define the target wizard;

c) prompting the developer to create an overall target wizard skeleton, the overall target wizard skeleton including a plurality of panel objects instantiated from the wizard framework for guiding a user of the target wizard;

d) prompting the developer to specify a number of subwizards to be added to the overall target wizard skeleton;

e) prompting the developer to specify a number of panels for each of the subwizards added to the overall target wizard skeleton;

f) creating a wizard state object from the wizard framework for referencing at least one state attribute, a wizard default object for referencing at least one default attribute, and wizard panel object for referencing at least one panel attribute, the wizard state object, and the wizard panel object comprising objects instantiated from the wizard framework; and g) creating a wizard state controller object for defining and storing relationships between the at least one state attribute, the at least one default attribute, and the at least one panel attribute, the wizard state controller object being instantiated from the wizard framework.

45. The method of claim 44 wherein the steps of creating a wizard state object for referencing at least one state attribute, creating a wizard default object for referencing at least one default attribute, and creating wizard panel object for referencing at least one panel attribute comprises instantiating those objects from the wizard framework.

46. The method of claim 44 wherein the step of prompting the developer to create a target wizard skeleton comprises prompting the developer to select creating a new target wizard skeleton or selecting reusing previously saved wizard meta data to create a target wizard skeleton.

47. The method of claim 44 further comprising the step of prompting the developer to save wizard meta data if desired.

48. The method of claim 44 wherein the step of prompting the developer to create a target wizard skeleton comprises creating a wizard environment object, a wizard manager object, a wizard default object.

49. The method of claim 44 further comprising the step of prompting the developer to select a process development mode where the developer is guided through each step of creating a target wizard skeleton or select a power development mode where the developer is taken to a visual constructor where the developer can manually create a new target wizard skeleton.

50. A method for facilitating the creation of a target wizard, the method comprising the steps of:

a) providing a wizard framework, the wizard framework defining a plurality of classes used to define the target wizard;

b) providing a wizard mechanism for guiding a developer through the process of creating a wizard from the wizard framework;

c) creating an overall target wizard skeleton, the overall wizard target skeleton comprising objects instantiated from the wizard framework;

d) prompting the developer to specify a number of subwizards to be added to the overall target wizard skeleton;

e) prompting the developer to specify a number panels for each of the subwizards added to the overall target wizard skeleton;

f) creating a wizard state object for referencing at least one state attribute, a wizard default object for referencing at least one default attribute, and wizard panel object for referencing at least one panel attribute, the wizard state object, and the wizard panel object comprising objects instantiated from the wizard framework; and g) creating a wizard state controller object for defining and storing relationships between the at least one state attribute, the at least one default attribute, and the at least one panel attribute, the wizard state controller object being instantiated from the wizard framework.

51. The method of claim 50 wherein the step of creating an target wizard skeleton comprises prompting the developer to select creating a new target wizard skeleton or selecting reusing previously saved wizard meta data to create a target wizard skeleton.

52. The method of claim 50 further comprising the step of prompting the developer to save wizard meta data if desired.

53. The method of claim 50 wherein the step of creating a target wizard skeleton comprises creating a wizard environment object, a wizard manager object, a wizard default object.

54. The method of claim 50 further comprising the step of prompting the developer to select a process development mode where the developer is guided through each step of creating a target wizard skeleton or select a power development mode where the developer is taken to a visual constructor where the developer can manually create a new target wizard skeleton.

\* \* \* \* \*